(12) United States Patent
Dirr

(10) Patent No.: US 9,868,197 B2
(45) Date of Patent: Jan. 16, 2018

(54) VALVE

(71) Applicant: Colin Dirr, Hattingen (DE)

(72) Inventor: Colin Dirr, Hattingen (DE)

(73) Assignee: CONSTRUCTION TOOLS GMBH, Essen (DE)

( * ) Notice: Subject to any disclaimer, the term of this patent is extended or adjusted under 35 U.S.C. 154(b) by 560 days.

(21) Appl. No.: 14/370,552

(22) PCT Filed: Mar. 12, 2013

(86) PCT No.: PCT/DE2013/000139
§ 371 (c)(1),
(2) Date: Sep. 10, 2014

(87) PCT Pub. No.: WO2013/143520
PCT Pub. Date: Oct. 3, 2013

(65) Prior Publication Data
US 2015/0013794 A1    Jan. 15, 2015

(30) Foreign Application Priority Data

Mar. 30, 2012  (DE) .................. 10 2012 006 587
Jun. 20, 2012  (DE) .................. 10 2012 012 297

(51) Int. Cl.
| | |
|---|---|
| *B25D 9/12* | (2006.01) |
| *B25D 9/22* | (2006.01) |
| *B25D 9/26* | (2006.01) |
| *E02F 3/96* | (2006.01) |
| *E02F 9/22* | (2006.01) |
| *E21B 4/14* | (2006.01) |
| *F16B 13/04* | (2006.01) |
| *F16K 11/085* | (2006.01) |
| *F15B 13/04* | (2006.01) |

(52) U.S. Cl.
CPC .............. *B25D 9/22* (2013.01); *B25D 9/12* (2013.01); *B25D 9/265* (2013.01); *E02F 3/966* (2013.01); *E02F 9/2267* (2013.01); *E21B 4/14* (2013.01); *F15B 13/0406* (2013.01); *F16K 11/0856* (2013.01); *Y10T 137/87169* (2015.04)

(58) Field of Classification Search
CPC ......... B25D 9/22; B25D 9/26; F15B 13/0403; F15B 13/0406
USPC ................................ 137/630; 251/30.04, 38
See application file for complete search history.

(56) References Cited

U.S. PATENT DOCUMENTS 2,523,532 A    9/1950  Harinck
4,478,248 A *  10/1984  DeVall .................... B25D 9/22
                                            137/596.18

(Continued)

FOREIGN PATENT DOCUMENTS

DE         10240852 A    3/2004

*Primary Examiner* — Thanh Truong
*Assistant Examiner* — Patrick Fry
(74) *Attorney, Agent, or Firm* — Andrew Wilford

(57) ABSTRACT

The present invention relates to a valve for a hydraulically operated percussion mechanism having a main valve (2, 102) which is in the form of a rotary slide valve having a rotary slide. In order to reduce the installation space and the production costs of such valves, it is proposed according to the invention that the rotary slide is configured as a receiving housing which receives a valve element in the form of a secondary valve (68, 114). Furthermore, the invention relates to the use of a valve which is arranged on a percussion mechanism of a hydraulic hammer.

9 Claims, 9 Drawing Sheets

(56) References Cited

U.S. PATENT DOCUMENTS

| | | | |
|---|---|---|---|
| 5,667,022 A | 9/1997 | Guede | |
| 5,669,281 A * | 9/1997 | Comarmond | B25D 9/26 91/245 |
| 5,860,481 A * | 1/1999 | Prokop | B25D 9/14 173/17 |
| 6,334,495 B2 * | 1/2002 | Deimel | B25D 9/14 173/115 |
| 6,481,461 B1 | 11/2002 | Habermann | |
| 6,672,403 B2 * | 1/2004 | Ahr | B25D 9/265 173/1 |
| 7,779,930 B2 * | 8/2010 | Lohmann | B25D 9/265 173/115 |

\* cited by examiner

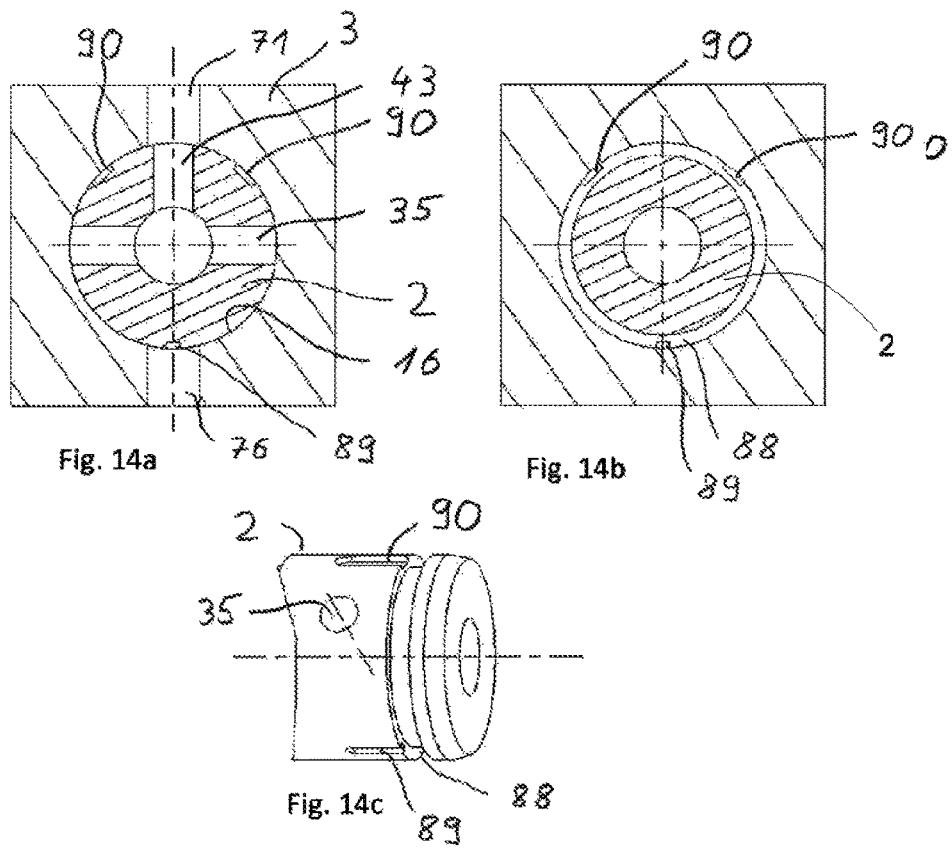
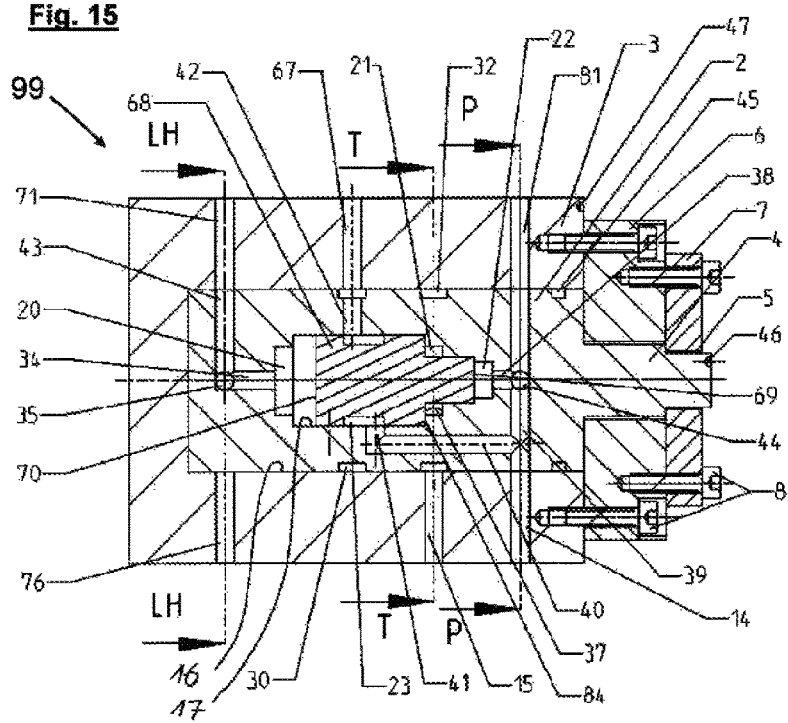

VALVE

CROSS REFERENCE TO RELATED APPLICATIONS

This application is the US-national stage of PCT application PCT/DE2013/000139 filed 12 Mar. 2013 and claiming the priority of German patent application 102012006587.6 itself filed 30 Mar. 2012 and German patent application 102012012297.7 itself filed 20 Jun. 2012.

FIELD OF THE INVENTION

The present invention relates to a valve for a hydraulically operated impact mechanism having a main valve that is realized as a rotary slide valve with a rotary slide, and to the use of such a valve.

BACKGROUND OF THE INVENTION

Hydraulic hammers sometimes comprise several valves that are necessary, for example, in order to control a back and forth movement of the impact piston, to adapt the operating ratio and the output of the impact mechanism to certain operating states or to protect the impact mechanism from overload. For certain applications, for example, both a manual stroke switch-over (long stroke or short stroke) and a manual switch-over of the no-load stroke safety mechanism are required (normal mode or no-load stroke safety mechanism) that can be achieved as a result of two separately arranged and switchable valves.

According to the prior art designs are known, for example, where the functions stroke switch-over and no-load stroke safety are set up either via two separate valves or via one single valve.

In the case of a design with two valves, along with the long stroke line a separate short stroke line leads to the one valve and a separate no-load stroke line leads to the other valve that open at different positions (axially spaced apart) on the cylinder working surface. As a result, in the return stroke, the piston path between the theoretical impact position and the position at which the impact stroke is introduced, and the piston path in the impact stroke direction, between the theoretical impact position and the position at which the impact mechanism is shut off, are able to be chosen in a relatively free manner. A disadvantage is the large amount of installation space necessary for the two valves, the many lines leading to the valves and the high amount of expenditure on production connected thereto, which results in large outer dimensions, the impact mechanism being heavy in weight and high production costs.

As a result of the separate lines and the separate valves, the following switching combinations are possible:
Normal (long)—stroke normal mode
Normal (long)—stroke no-load stroke safety mechanism activated (shut off)
Short stroke—no-load stroke safety mechanism deactivated (normal mode)
Short stroke—no-load stroke safety mechanism activated (shut off)

In the case of designs with one valve that controls both functions (stroke switch-over and no-load stroke safety mechanism), two control functions (short stroke and no-load stroke safety mechanism) are realized by the common use of one single line that, depending on the switching position of the valve, acts either as a no-load stroke line (shut off line) or a short stroke line. A disadvantage, however, is that the stroke length in the short stroke and the piston path between the theoretical impact position and the position at which the execution of a return stroke and further operating cycles is stopped (shut off) are dependent on one another and are not able to be freely chosen, which can have a disadvantageous effect on the function, the output and the installation space of the impact mechanism.

The following combinations are possible according to the known prior art when using one valve and one common line:
Normal (long) stroke—no-load stroke safety mechanism activated (shut off)
Normal (long) stroke—no-load stroke safety mechanism deactivated (normal mode)
Short stroke—no-load stroke safety mechanism deactivated (normal mode).

In addition, hydraulic impact mechanisms sometimes comprise even more valves, for example, a pilot valve for actuating the control slide, a pressure relief valve or flow regulating valve in order to adjust or limit the output or the operating pressure of the impact mechanism. Said valves as well as the above-described stroke switch-over valves and no-load stroke safety valves have been installed up to now separately from one another in the impact mechanism components.

OBJECT OF THE INVENTION

The object of the present invention is to reduce the installation space and the production costs of such valves.

SUMMARY OF THE INVENTION

According to the invention, the rotary slide of a rotary slide valve is developed as a housing that receives a valve element that is realized as a secondary valve. As a result of nesting two valves in one another in said manner, the number of necessary bores for valves in the impact mechanism, as well as the number of bores necessary for the hydraulic connection of the valves is reduced. The installation size of the impact mechanism, its weight and its production costs can be reduced as a result. Even complicated small components, such as valve modules, can also be produced in a more cost-efficient manner than a plurality of valve bore receiving means in the large impact mechanism components that are essentially larger, more unwieldy and more difficult to process, such as cylinder covers or cylinders. The design principle of nested valves is also possible for other valve functions and valve designs.

According to a first preferred embodiment, the rotary slide valve is arranged in a housing that can be a separate valve block, for example that is arranged on the impact mechanism. As an alternative to this, the rotary slide can also be installed directly in a bore of the impact mechanism that is situated, for example, in the cylinder cover or cylinder of the impact mechanism, whereby the cylinder cover or the cylinder forms the housing. In addition, the rotary slide could be mounted in a bush in order to be inserted into a bore as a unit of a valve cartridge. The arrangement of the rotary slide valve is not limited to the named examples.

According to a further preferred embodiment of the invention, it is provided that the secondary valve is realized as a rotary slide valve, a longitudinal slide valve or a seat valve, the main valve preferably being actuatable manually and the secondary valve preferably being actuatable manually or hydraulically. According to a further development of such a valve, it is provided that a secondary valve in the form of a hydraulically actuatable longitudinal slide valve, which can be used as a pilot valve for the control slide, is arranged in the rotary slide of a manually actuatable rotary slide valve, by way of which the functions of a stroke switch-over and a no-load stroke safety mechanism are controlled. The valve element of the longitudinal slide valve is arranged or mounted in the rotary slide. In other words, the rotary slide provides the valve housing of the longitudinal slide valve.

In order to protect the impact mechanism against too high loads in the case of no-load strokes that occur whenever the impact mechanism is not pressed sufficiently by the bit against the material to be processed or the bit penetrates right into soft material, the operation of the impact mechanism with a normal stroke, which is also called a long stroke, should only be possible with, at the same time, an activated no-load stroke safety mechanism (shut off), for which purpose the main valve has two switching functions. The main valve or the rotary slide valve is preferably realized such that the stroke of the impact piston is modifiable by a first switching function of the main valve, and it is determinable by a second switching function whether the impact mechanism carries out further strokes after the occurrence of at least one no-load stroke. As a result of the two switching functions, the switching of the rotary slide valve can influence the stroke length and at the same time the shut off behavior (no-load stroke safety mechanism) of hydraulic impact mechanisms. In each case one switching position of the stroke switching function has associated therewith a switching position of the no-load stroke safety function.

According to a further preferred embodiment of the invention, it is provided that one switching position each of a first switching function is coupled with one switching position each of a second switching function. In particular, the switching positions of the switching functions are coupled such that when the impact mechanism carries out impact strokes with a long stroke as a result of the first switching position of the first switching function, the impact mechanism is stopped once a no-load stroke occurs as a result of the first switching position of the second switching function and that when the impact mechanism carries out impact strokes with a short stroke as a result of the second switching position of the first switching function, the impact mechanism is not stopped once a no-load stroke occurs as a result of the second switching position of the second switching function and carries out or can carry out no-load strokes repeatedly. However, the second switching position leads only to repeated no-load strokes when the bit is not pressed on correctly or breaks as a result of the material and as a result the impact piston overshoots its theoretical impact position in the impact stroke direction by a certain amount. If the impact mechanism, for example, is pressed on sufficiently again after one or more no-load strokes, "normal" strokes with a reduced stroke (short stroke) are carried out. Over and above this, it is provided that the switching positions of the switching functions are coupled such that in the respective first switching positions a no-load stroke line is connected to a pressure line that provides the operating pressure and the short stroke line is separated from the long stroke line and in the respective second switching positions the no-load stroke line is separated from a pressure line that provides the operating pressure and the short stroke line is connected to a long stroke line.

As a result of said measures and the adjustment possibilities between only two switching positions, only the following switching combinations are possible:

Normal (long) stroke—Activated no-load stroke safety mechanism (shut off)

Short stroke Deactivated no-load stroke safety mechanism (normal mode)

If the number of switching positions were increased, more combinations would also be possible.

Within the framework of the present invention, the following preferred embodiments are provided in particular:

a) The main valve is preferably a 4/2-way rotary slide valve and the secondary valve is a 3/2-way longitudinal slide valve. The rotary slide valve is manually actuatable and in both switching positions is lockable in a positive locking manner. In a first switching position of the main valve, the short stroke line is separated from the long stroke line (long stroke) and the no-load stroke line is connected to the pressure line (no-load stroke safety mechanism activated). In a second switching position of the main valve, the short stroke line is connected to the long stroke line (short stroke) and the no-load stroke line is separated from the pressure line (no-load stroke safety mechanism deactivated).

The secondary valve is preferably hydraulically actuatable and has a first switching position in which the control face of the control slide is connected for directing the pressure (impact stroke position). In a second switching position the control face of the control slide is connected to the tank line (return stroke position).

b) As an alternative to this the main valve can be realized as a 4/3-way rotary slide valve and the secondary valve as a 3/2-way longitudinal slide valve. In a first switching position of the main valve, the short stroke line is separated from the long stroke line (long stroke) and the no-load stroke line is connected to the pressure line (no-load stroke safety mechanism activated). In a second switching position of the main valve, the short stroke line is separated from the long stroke line (long stroke) and the no-load stroke line is separated from the pressure line (no-load stroke safety mechanism deactivated). Over and above this, a third switching position of the main valve is provided in which the short stroke line is connected to the long stroke line (short stroke) and the no-load stroke line is separated from the pressure line (no-load stroke safety mechanism deactivated).

The hydraulically actuatable secondary valve has two different switching positions, in a first switching position the control face of the control slide being connected to the pressure line (impact stroke position), and in a second switching position the control face of the control slide being connected to the tank line (return stroke position).

c) According to a further embodiment, it is provided that the main valve is realized as a 3/2-way rotary slide valve and the secondary valve as a 3/2-way longitudinal slide valve. In the case of such a development, the main valve comprises 3 hydraulic connections, one connection being connected to a signal line that, in dependence on the switching position of the main valve, assumes the function of a short stroke line or no-load stroke line. In a first switching position of the main valve, the signal line is separated from the long stroke line and is connected to the pressure line (long stroke, no-load stroke safety mechanism activated). In the second switching position of the main valve, the signal line is connected to the long stroke line and separated from the pressure line (short stroke, no-load stroke safety mechanism deactivated).

In the first switching position of the hydraulically actuatable secondary valve, the control face of the control slide is connected to the pressure line (impact stroke position), whilst in the second switching position of the secondary valve the control face of the control slide is connected to the tank line (return stroke position).

d) Finally, one embodiment is provided with a 2/2-way rotary slide valve as main valve and a 2/2-way longitudinal slide valve as secondary valve, both valves being able to assume two different switching positions and having in each case two hydraulic connections. In a first switching position of the main valve, the short stroke line is separated from the long stroke line (long stroke), whilst in the second switching position of the main valve the short stroke line is connected to the long stroke line (short stroke). The preferably manually actuatable secondary valve that can be locked in a positive locking manner comprises a first switching position in which the no-load stroke line is separated from the pressure line (no-load stroke safety mechanism deactivated), and a second switching position in which the no-load stroke line is connected to the pressure line (no-load stroke safety mechanism activated).

BRIEF DESCRIPTION OF THE DRAWING

Concrete designs of the invention are described below with reference to the drawings, in which:

FIGS. 10a, 10b, 11a, 11b, 12a, 12b, 13a, 13b, 14a, and 14b are sections through the rotary valve according to this invention in various different positions and configurations;

FIG. 14c is a perspective view of a detail of the rotary valve;

FIGS. 15, 16, 17, and 18 are axial sections through rotary valves in according to with this invention.

SPECIFIC DESCRIPTION OF THE INVENTION

Figure 1:
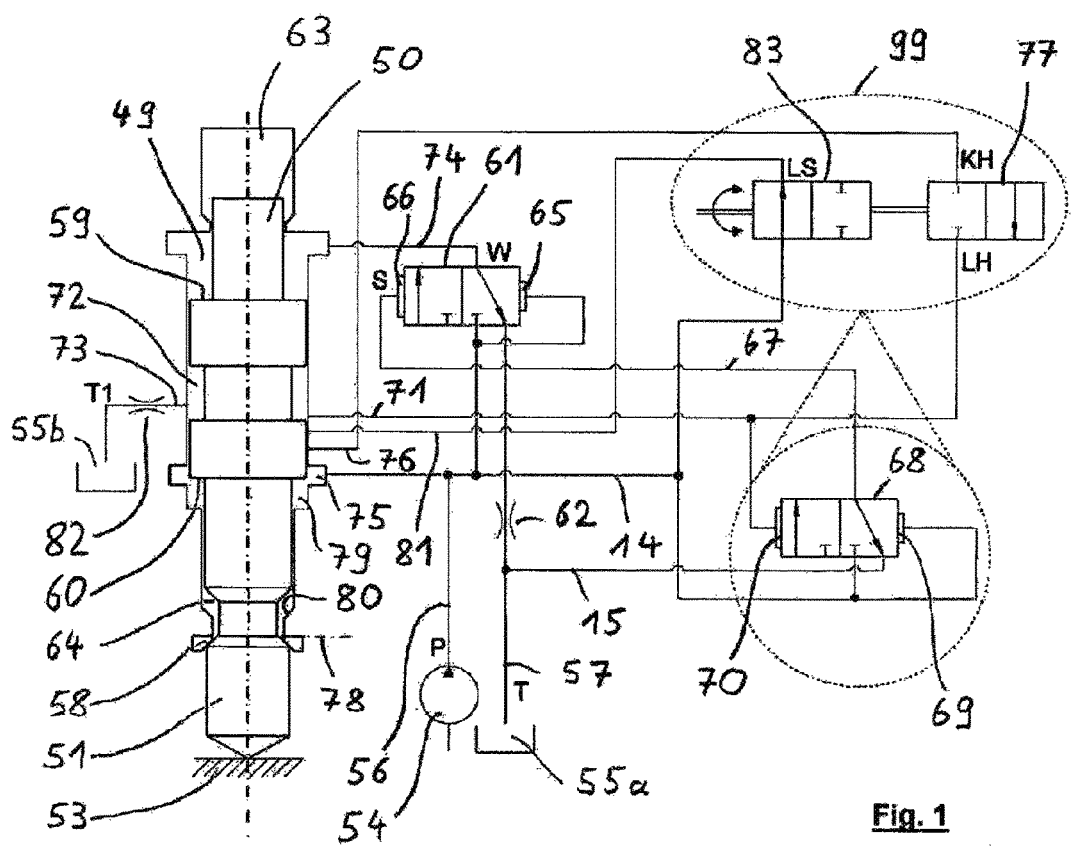
FIGS. 1-10 are schematic views illustrating the instant invention.

As seen in FIG. 1, pressure-operated impact devices are used in hydraulic hammers that serve in particular for crushing stone, concrete or other building materials and are used in hammer drills that serve for drilling holes in stone and other building materials and are used in the majority of cases as additional or attachment devices for construction machines such as diggers, loaders or other carrier units.

The impact mechanism is hydraulically connected to the pump 54 or the tank 55a, 55b of a carrier device, for example a digger, by a pressure line 56 as well as a tank line 57. The valves present on the digger that are utilized, for example, for producing or interrupting the connection between the pump and the pressure line, for limiting the maximum pressure or limiting the volume flow flowing in the pressure line, are not shown here in order to improve clarity. The impact mechanism consists of a cylinder housing in which a impact piston 50 is guided, a cylinder cover and a hammer bottom part in which the bit 51 or the insertion end is mounted by wearing bushes. The cylinder cover, the cylinder housing and the hammer bottom part form the main components of the impact mechanism housing. Only the simplified inner contour of the cylinder housing and of the cover are shown. In normal mode, the carrier device presses the impact mechanism in the direction of the material 53 to be processed such that the impact mechanism is supported by the bit stop 58, which is arranged in the hammer bottom part, against a contact face of the upper bit end and the bottom bit end is pressed against the material to be processed.

In normal mode, at the end of each impact stroke the hydraulically driven impact piston strikes onto the upper end of the bit that is situated in the impact mechanism housing and transmits its kinetic energy to the bit. The energy introduced into the bit brings about a high impact force that is transmitted from the bit to the material and thereby causes the destruction of the material.

The impact piston 50 is realized as a differential piston, i.e. it has two ring-shaped drive faces 59, 60 that are arranged opposite one another and are of different sizes. The bottom drive face 60, by means of which the return stroke, by way of which the impact piston is moved upward, is triggered when pressure is applied, is constantly acted upon with a predetermined operating pressure that is exerted in the pressure line 56 during the operation. The top drive face 59, by means of which the impact stroke, by way of which the impact piston is moved downward, is triggered when acted upon with pressure, is acted upon with operating pressure in dependence on the position of a control slide 61 or is relieved to tank pressure. The impact stroke is possible as the upper ring-shaped drive face 59 is greater than the bottom one 60 such that, when both faces are acted upon with operating pressure, a resultant force, which is directed in the impact direction, is produced. In the case of the so-called impact stroke, the moving piston displaces the oil, displaced by the small bottom drive face, in the direction of the larger upper drive face 59 of the piston, to which the oil coming from the pump 54 also flows. In the case of the return stroke, the oil flows from the pump 54 exclusively in the direction of the smaller-area bottom drive face 60, whereas the oil from the larger-area upper drive face 59 is removed to the tank 55a by a return throttle 62 that ensures that the hammer runs smoothly.

The impact mechanism shown also has a gas storage means 63, namely a space that is pressurized with gas, into which the upper end face of the piston projects. The gas pressure in said space exerts an additional force, which acts in the direction of the impact stroke, onto the piston. However, the addressed impact mechanisms can also be realized without gas storage means. The piston part located at the bottom end of the piston including the end or impact face there projects into a so-called impact space 64 that is connected to the atmosphere.

The control slide 61, which has already been mentioned in the introduction and is preferably situated in the cylinder cover of the impact mechanism, in dependence on the switching position, connects the larger-area upper drive face 59 either to the pressure line 56, such that the operating pressure is exerted there or during the return stroke relieves said face by the tank line 57, to the tank 55a.

The control slide 61, similar to the impact piston, can also have two drive faces, a first face, the resetting face 65, being constantly acted upon with operating pressure via the pressure line 56 and a larger-area second face, the control face 66, which is opposite said first face, being acted upon selectively with operating pressure or being relieved to tank pressure. As a result of the different size of the two faces, the control slide can be displaced into one of its end positions when the faces are acted upon correspondingly with pressure.

The control face 66 is connected to a reversing line 67 that is selectively acted upon with the operating pressure or is relieved to tank pressure via a pilot valve 68. To this end, the pilot valve is connected to the pressure line 56 via the pressure line 14 and to the tank line 57 via the tank line 15. As the pilot valve comprises three switchable connections 14, 15 and 67 and is able to assume two switching positions, it belongs to the group of the 3/2-way valves.

Similarly to the control slide, the pilot valve 68 has two drive faces, a first face, the resetting face 69, being constantly acted upon with the operating pressure via the pressure line 56 and a second larger-area face, the control face 70 that is arranged opposite said first face, being selectively acted upon with the operating pressure or being relieved to tank pressure. As a result of the different size of the drive faces, the valve slide of the pilot valve is able to be displaced into one of its switching positions when the faces are acted upon correspondingly with pressure.

The control face 70 of the pilot valve is connected to a long stroke line 71 that opens out in such a manner into the cylinder space 49, in which the impact piston is guided, that it is acted upon with operating pressure or is relieved to tank pressure in dependence on the piston position. In the bottom reversal position in which the impact piston contacts the tool in the normal operating state, the opening out of the long stroke line 71 is connected via a circumferential groove 72 arranged between the drive faces of the impact piston to a tank line 73 that also opens out into the working cylinder and in which a lower pressure prevails, as a result of which the control face 70 of the pilot valve is relieved to the tank 55b and the valve slide of the pilot valve 68 assumes a first end position (return stroke position). The tank lines 57 and 73 are combined inside the impact mechanism and open out into a common tank of the carrier device that, here, for the sake of clarity, is shown as two tanks 55 or 55a. If the pilot valve is situated in a first switching position, the return stroke position, it connects the reversing line 67 to the tank line 15, the pressure in the reversing line and on the drive face 66 of the control slide drops. On account of the operating pressure exerted constantly on the resetting face 65 of the control slide, the control slide is switched into the switching position that is designated as the return stroke position. The control slide connects the upper drive face 59 of the impact piston to the tank line 57 via the alternating pressure line 74. On account of the operating pressure exerted constantly on the bottom drive face 60 of the impact piston, the impact piston is displaced upward in opposition to the impact stroke direction. The oil displaced by the upper piston drive face flows via a return throttle 62 in a throttled manner to the tank, as a result of which in the return stroke a pressure level necessary for a gentle run is maintained on the upper drive face.

Figure 2:
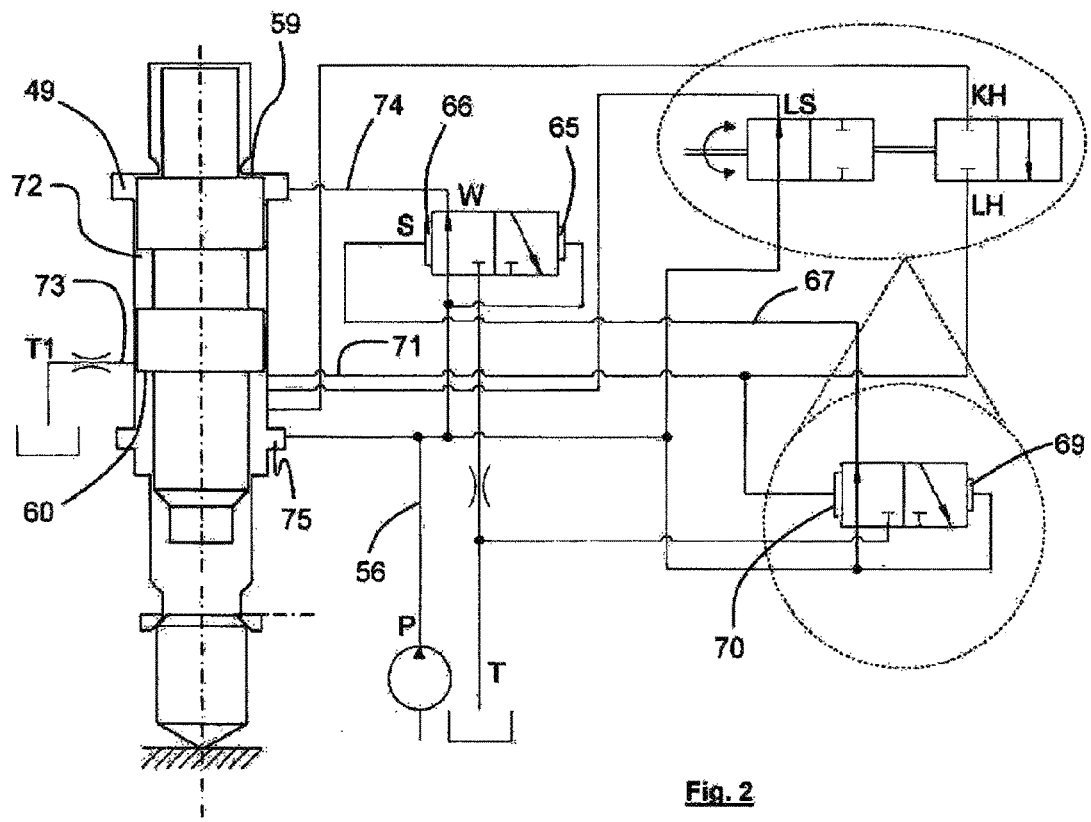

Description of FIG. 2:

If the impact piston is moved upward out of the impact position during the return stroke, it again covers the long stroke line 71 that opens out into the cylinder space 49 in order to release it after a piston stroke, which is designated as a long stroke, close to the upper reversal point to the bottom drive chamber 75. As the bottom drive chamber is connected to the pressure line 56, in which operating pressure prevails, said operating pressure then also acts in the long stroke line 71 and onto the control face 70 of the pilot valve. As the control face 70 has a larger area than the resetting face 69, in spite of the same pressure on both faces, a resultant force acts on the valve slide that switches it into the other switching position, the impact stroke position. The pilot valve then connects the reversing line 67 and consequently the control face 66 of the control slide to the pressure line 14. As the control face 66 has a larger area than the resetting face 65, in spite of the same pressure on both faces, a resultant force acts on the control slide that switches it into the other switching position, the impact stroke position. The control slide then connects the upper drive face 59 of the impact piston to the pressure line 56 via the alternating pressure line 74. As the upper drive face 59 has a larger area than the bottom drive face 60, in spite of the same pressure on both faces, a resultant force acts on the impact piston that accelerates it in the impact stroke direction toward the bit. During the impact stroke, the piston again covers the long stroke line and connects the same, as described above, via the circumferential groove 72 to the tank line 73 again, shortly before the piston contacts the bit. A return stroke is then carried out again etc.

Figure 3:
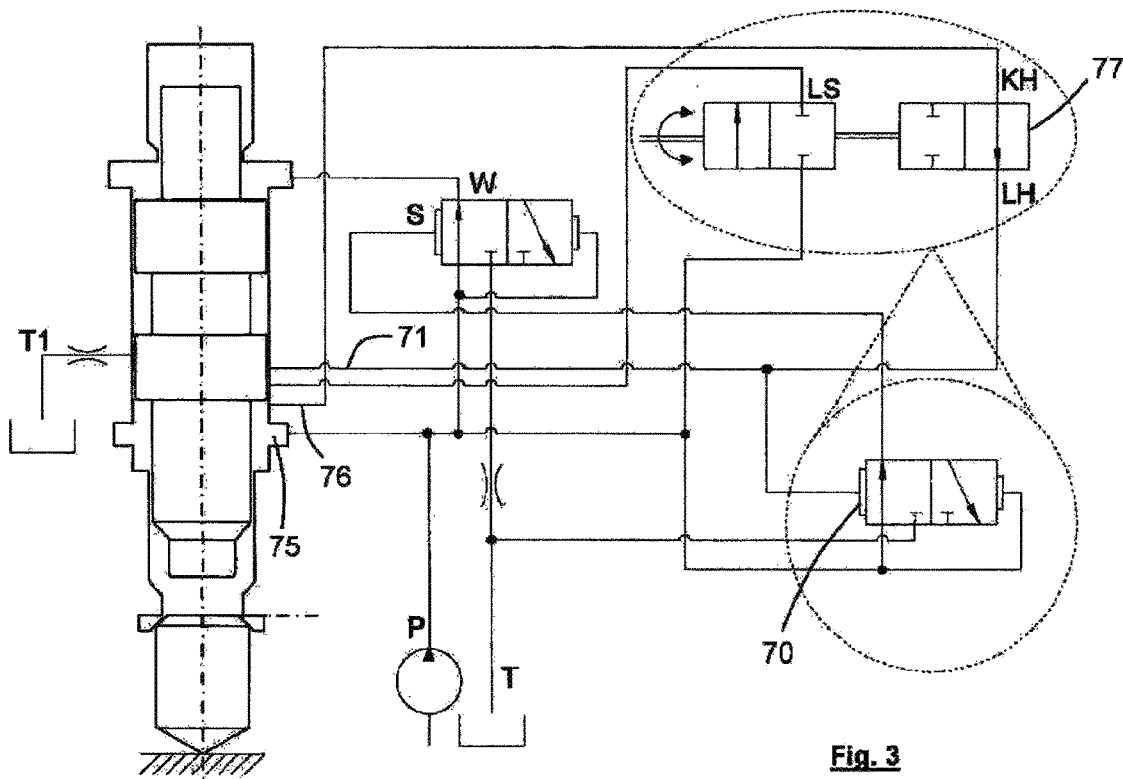

Description of FIG. 3:

Hydraulic impact mechanisms can be provided with a stroke switch-over valve that is manually switchable and causes the impact piston to carry out strokes with a different stroke length in dependence on the switching position. As a result of reducing the stroke, the time during which the piston is accelerated in the impact stroke is shortened, as a result of which the speed of the piston at the moment of the impact onto the bit is also reduced. The slower contact speed brings about a lower individual impact energy that is sufficient where the material to be destroyed is less hard. On account of the shorter acceleration time, the impact piston is able to carry out impact strokes repeatedly after a shorter time, i.e. the operating frequency increases, which increases the productivity of the impact mechanism in the case of softer material.

Next to the long stroke line 71 the impact mechanism comprises a short stroke line 76 that is arranged in the case of the alignment of the impact mechanism shown in the diagram below the long stroke line. By means of the stroke switch-over valve 77, in one switching position, the short stroke position, the short stroke line 76 can be connected to the long stroke line 71, or in the other switching position, the long stroke position, can be separated from it. If after the impact of the impact piston onto the bit the impact piston is raised upward during the return stroke, the short stroke line, after a reduced piston path compared to the long stroke, which is designated as short stroke, is released from the piston and acted upon with the operating pressure that prevails in the bottom drive chamber 75. The operating pressure is then directed via the short stroke line 76, the stroke switch-over valve 77 that is in the short stroke position, into the long stroke line 71 and consequently onto the control face 70 of the pilot valve. As described above, the pilot valve and, triggered as a result, the control slide in each case switch into their switching positions that are designated as the impact stroke position, as a result of which the impact piston reverses its direction of movement and carries out an impact stroke with reduced travel, the short stroke. If the stroke switch-over valve is situated in the long stroke position, in which the connection between the short stroke line and the long stroke line is separated, a pressure change in the short stroke line does not bring about a switch-over of the valves.

Figure 4:
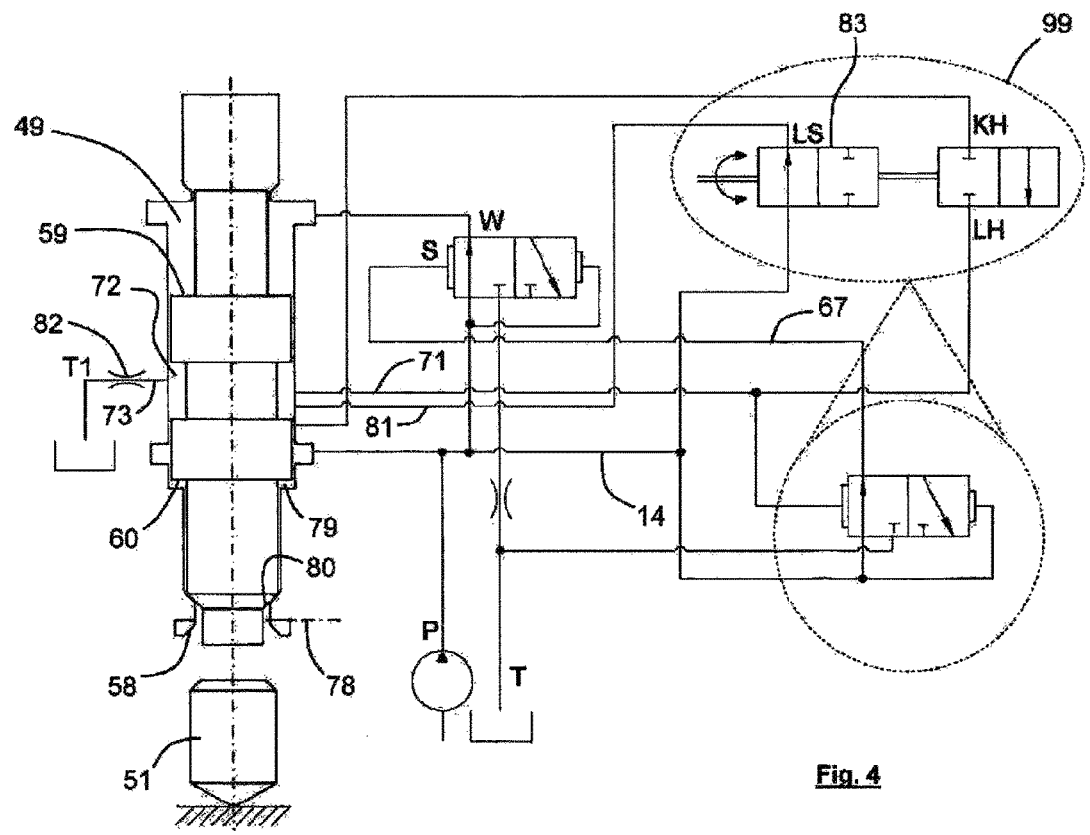

Description of FIG. 4:

If the impact mechanism is not pressed on sufficiently by the carrier device, if the bit does not abut against the material or if the bit breaks through the material, the bit 51 is removed from its contact face in the housing, the bit stop 58. A so-called no-load stroke occurs where the piston overshoots its theoretical impact position during the impact stroke. The theoretical impact position is described as the piston position where the impact piston contacts the bit when the bit abuts against the housing stop 58. The dot-dash line 78 identifies the plane perpendicular to the direction of movement of the impact piston in which the front impact piston end, or the upper bit end are situated when the impact piston is situated in the theoretical impact position or the bit has been pressed on sufficiently.

In the case of a no-load stroke, the piston sometimes does not contact the bit and the high kinetic energy of the impact piston cannot be introduced by the bit into the material to be destroyed. If the impact piston overshoots its theoretical impact position by a predetermined distance, the bottom drive face 60 plunges into a hydraulic catcher buffer 79, as a result of which it is braked in a delayed manner before it is stopped by a mechanical piston stop 80 that is arranged in the housing of the impact mechanism. As a result of the catcher buffer the impact piston is braked in a delayed manner and its high kinetic energy is introduced into the impact mechanism components in an extended manner, which prevents serious damage to the components and seals. In spite of the hydraulic catcher buffer, said operating situation represents a heavy load on the mechanism and the seals precisely in the case of impact strokes with a long stroke (long stroke mode) that should be avoided as much as possible in order not to shorten the life of the components.

In order to prevent repeated execution of no-load strokes, the control slide is switched to impact stroke when the impact piston overshoots its theoretical impact position in the direction of the impact stroke by a predetermined amount. To this end, a no-load stroke line 81 opens out in such a manner into the cylinder space 49 that the circumferential groove 72 on the impact piston is connected to the no-load stroke line when the impact piston overshoots its theoretical impact position by a predetermined amount. The circumferential groove is additionally connected to the long stroke line 71 and the tank line 73 along with the no-load stroke line. To prevent no-load strokes, the no-load stroke line 81 is connected to the pressure line 14 via a no-load stroke safety valve 83. The no-load stroke safety valve 83 is part of a rotary slide valve 99 that comprises another further switching function along with the switching function no-load stroke safety. Pressurized oil from the no-load stroke line 81 then flows via the circumferential groove 72 into the long stroke line 71 and into the tank line 73. As the tank line 73 comprises a greater throttle resistance than the no-load stroke line 81 on account of the throttle 82, a pressure is set on account of the different throttle resistances in the circumferential groove and consequently in the long stroke line that is lower than the operating pressure exerted in the pressure line 14, or 56, but is sufficient for the switch-over of the pilot valve into the impact stroke position. As described above, the switch-over of the pilot valve triggers the switch-over of the control slide into the switching position impact stroke position, which is brought about by the upper piston drive face 59 being acted upon with pressure, as a result of which the piston is moved further in the impact stroke direction until it abuts against the mechanical piston stop 80 and is stopped. The impact mechanism is consequently shut off, no further impact strokes are carried out. Said shutting off of the impact mechanism once a no-load stroke has occurred is designated as a no-load stroke safety mechanism. The impact mechanism does not carry out any impact strokes again until the impact piston is raised mechanically, via the displacement of the bit, so far in opposition to the impact stroke direction until the circumferential groove 72 is no longer connected to the no-load stroke line and the operating pressure prevailing in the no-load stroke line 81 is no longer directed into the long stroke line 71.

Figure 5:
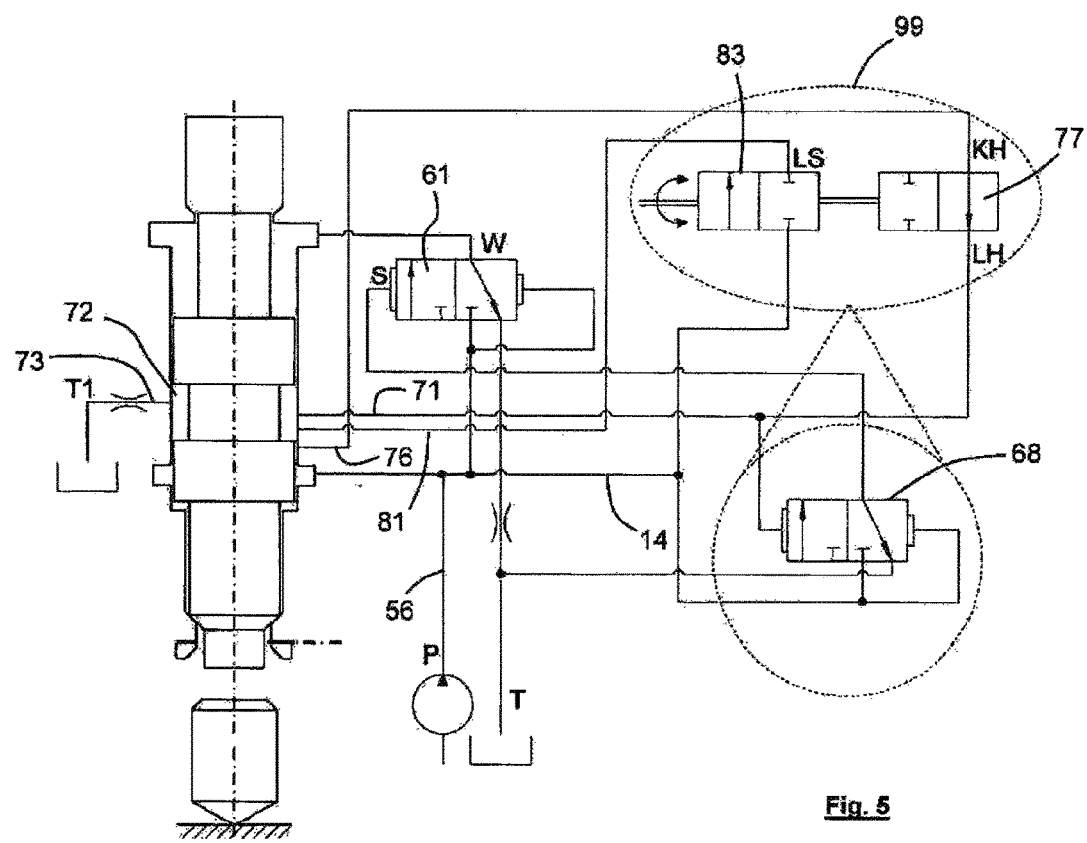

Description of FIG. 5:

As the avoiding of no-load strokes at a reduced stroke, the short stroke, is not necessary on account of the reduced individual impact stroke energy, separation is via the no-load stroke safety valve 83 that can separate or connect the connection between the no-load stroke line 81 and the pressure line 14 or 56 in dependence on the switching position. When the impact piston overshoots its theoretical impact position in the case of no-load strokes, the long stroke line 71 is always connected to the tank line 73 via the circumferential groove 72 and is relieved of high pressure such that the pilot valve, and triggered as a result, the control slide 61 are switched in each case into the switching positions designated as a return stroke position. The impact piston then repeatedly carries out return strokes and impact strokes for as long as pressurized oil is supplied to it via the pressure line 56. In order to permit the execution of repeating no-load strokes only in the operating mode short stroke, the two valve functions no-load stroke safety and stroke switch-over are combined in one common rotary slide valve 99 and the valve functions are coupled such that the no-load stroke line 81 is only separated from the pressure line 14 via the no-load stroke safety valve 83 (no-load stroke safety mechanism deactivated, no-load strokes possible) when the stroke switch-over valve 77 produces the connection between the short stroke line 76 and the long stroke line 71 (only short strokes possible). To this end, the rotary slide valve comprises two switching functions, one for the function no-load stroke safety and one for the function stroke switch-over.

The following switching combinations are possible:

Normal stroke (long stroke), no-load stroke safety mechanism activated (shut off)

Short stroke, no-load stroke safety mechanism deactivated (normal mode)

The ellipse shown by the dotted line illustrates that the switching functions no-load stroke safety and stroke switch-over are combined in one rotary slide valve 99. As the rotary slide valve comprises four connections 14, 71, 76, 81 and is able to assume two switching positions, it belongs to the group of 4/2-way valves.

The circle shown by the broken line and the lines tapering toward the ellipse shows that the pilot valve 68 in incorporated in the rotary slide valve 99.

Figure 6:
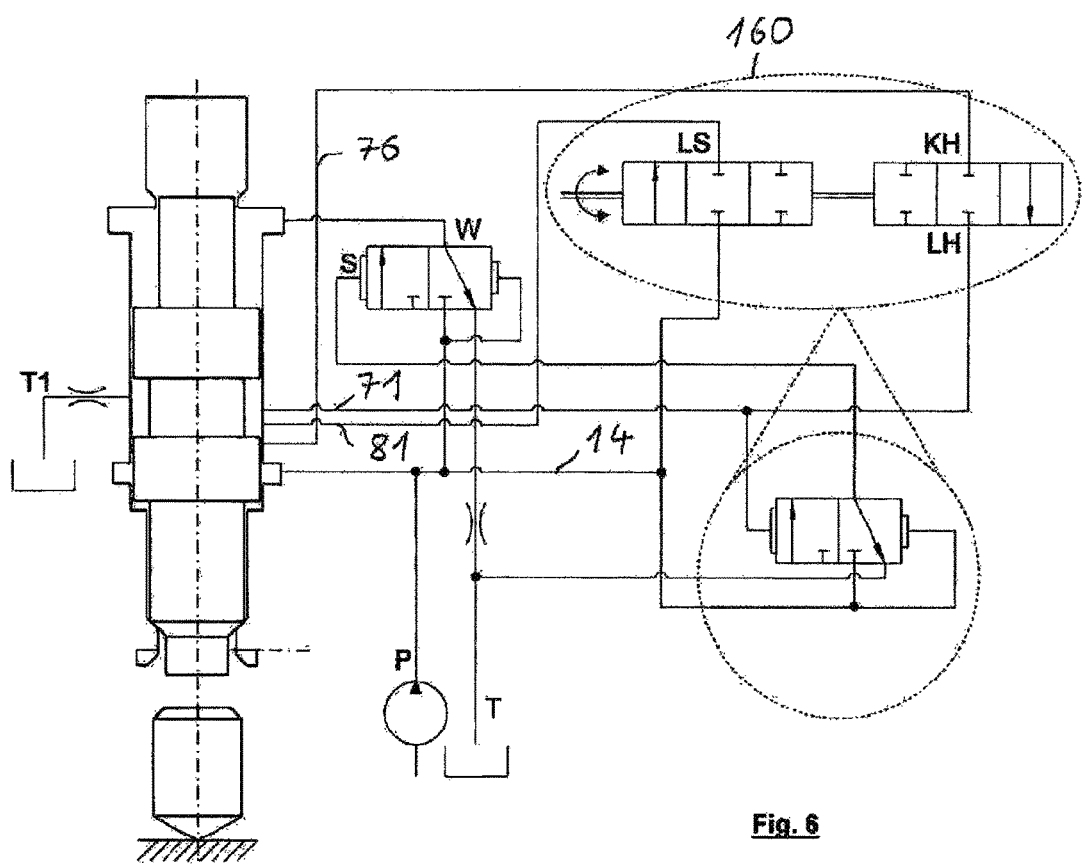

Description of FIG. 6:

Compared to the design according to FIG. 5, said design differs in that the rotary slide valve 160 is able to assume three switching positions. Newly added is the central switching position shown in the diagram in which the short stroke line 76 is separated from the long stroke line 71 and the no-load stroke line 81 is separated from the pressure line 14. Consequently, the execution of repeated no-load strokes is also possible when the impact mechanism carries out impact strokes with a long stroke (long stroke). In the case of some applications in which the bit, as a result of the unstable position of the material to be destroyed, is not able to be pressed fixedly against the material, yet a high level of individual impact stroke energy is necessary, such a setting results in increased productivity. The higher loads occurring in the case of no-load strokes in long stroke mode are accepted.

As the rotary slide valve comprises four connections 14, 71, 76, 81 and is able to assume three switching positions, it belongs to the group of 4/3-way valves.

The following switching combinations are possible;

Normal stroke (long stroke), no-load stroke safety mechanism activated (shut off)

Normal stroke (long stroke), no-load stroke safety mechanism deactivated (normal mode)

Short stroke, no-load stroke safety mechanism deactivated (normal mode)

Figure 7:
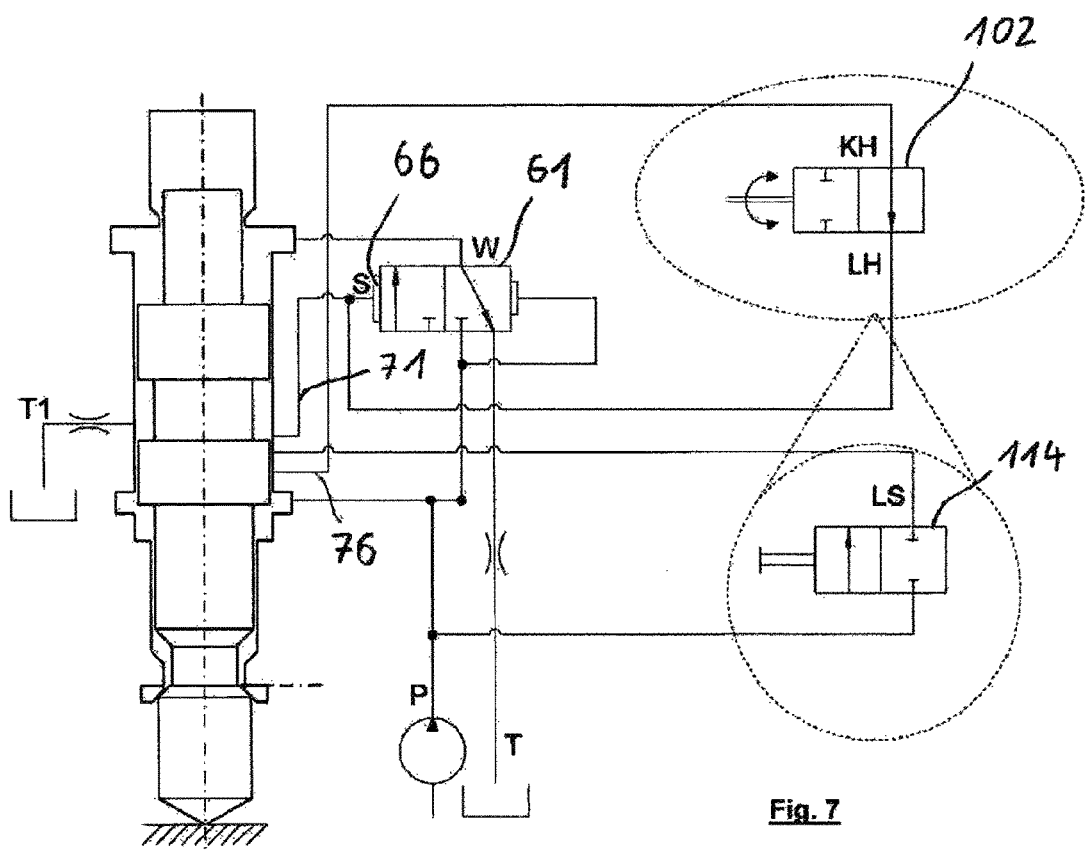

Description of FIG. 7:

Compared to the design according to FIG. 5, said design differs in that no pilot valve is used, but rather the long stroke line 71 acts at the same time as a reversing line and pressure signals in the long stroke line act directly on the control face 66 of the control slide. In addition, the functions stroke switch-over and no-load stroke safety are not coupled, but can be switched independently of one another. The stroke switch-over valve is realized as a rotary slide valve 102 in which a no-load stroke safety valve 114 is arranged as a longitudinal slide valve. As the rotary slide valve 102 and also the longitudinal slide valve 114 comprise in each case two connections and in each case are able to assume two switching positions, they belong to the group of 2/2-way valves. The longitudinal slide valve can also be realized as a seat valve in order to separate the connections from one another in a sealed manner in the closed position.

Figure 8:
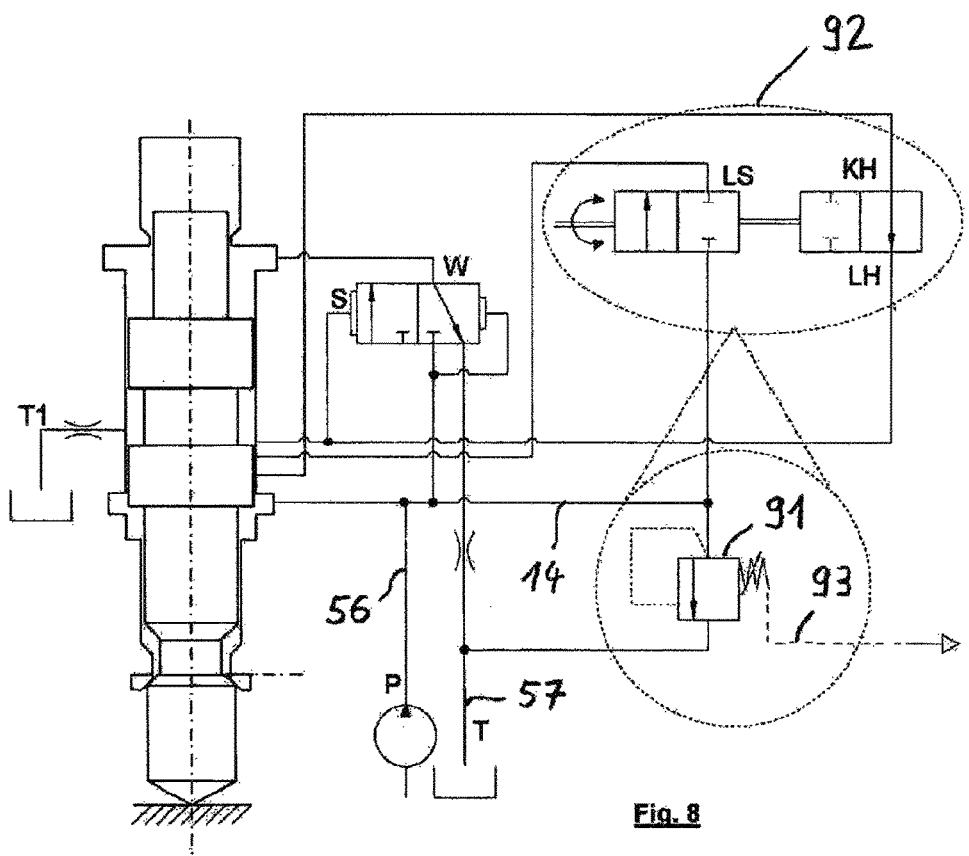

Description of FIG. 8:

Compared to the design according to FIG. 5, said control is realized without a pilot valve, as has already been described for FIG. 7. In this case, however, a pressure relief valve 91, which can be realized as a seat valve or a longitudinal slide valve, is incorporated in the rotary slide 92, in both cases, however, the valve element of the pressure relief valve carrying out a linear movement when actuated. The pressure relief valve is not actuated manually but by the pressure prevailing in the pressure line 14 that displaces the valve element against the adjustable force of a spring. If the pressure exceeds a predefined value, which is dependent on the preload force of the spring, the pressure relief valve opens a connection between the pressure line 14 and the tank line 57 such that the operating pressure is limited and an overload of the impact mechanism by an operation at too high a pressure is prevented. So that the possibly fluctuating pressure in the tank line 57 does not influence the opening pressure, the valve is realized with a relief line 93 that connects a drive face of the valve element that is arranged opposite the control face, to the atmosphere. Seals (not shown) prevent leakages between the faces acted upon with oil and the face of the pressure relief valve connected to the atmosphere in order to prevent oil escaping into the atmosphere. Non-return valves (not shown) can prevent ingress of moisture from the atmosphere into the relief line.

Figure 9:
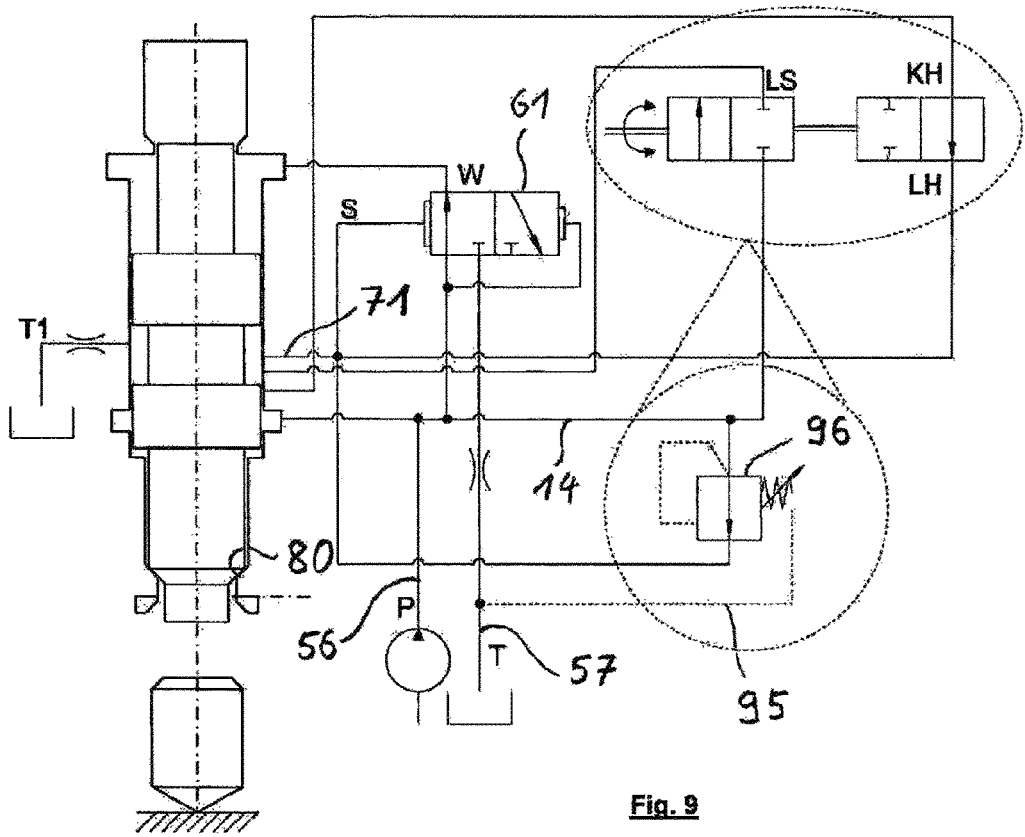

Description of FIG. 9:

Compared to the design according to FIG. 8, the impact mechanism is shut off when the admissible operating pressure is exceeded by a pressure control valve 96 producing a connection between the pressure line 14 and the long stroke line 71. Where the cross section of the pressure control valve is of sufficient size, when the admissible operating pressure is exceeded, such an amount of oil is supplied from the pressure line via the open pressure valve 96 into the long stroke line that the pressure being set in the long stroke line is sufficient to switch the control slide 61 into the switching position impact stroke position. The impact piston is moved further in the direction of the impact stroke until it is stopped at the piston stop 80. The impact mechanism does not execute any further impact strokes, in spite of a high pressure present in the pressure line 56 a mechanical overload is prevented and the stopping of the hammer operation signals to the user that the amount of oil supplied and the oil pressure exerted have exceeded the admissible limit values. The relief line 95 of the pressure control valve is connected to the tank line. The pressure control valve is incorporated in the rotary slide.

Figure 10:
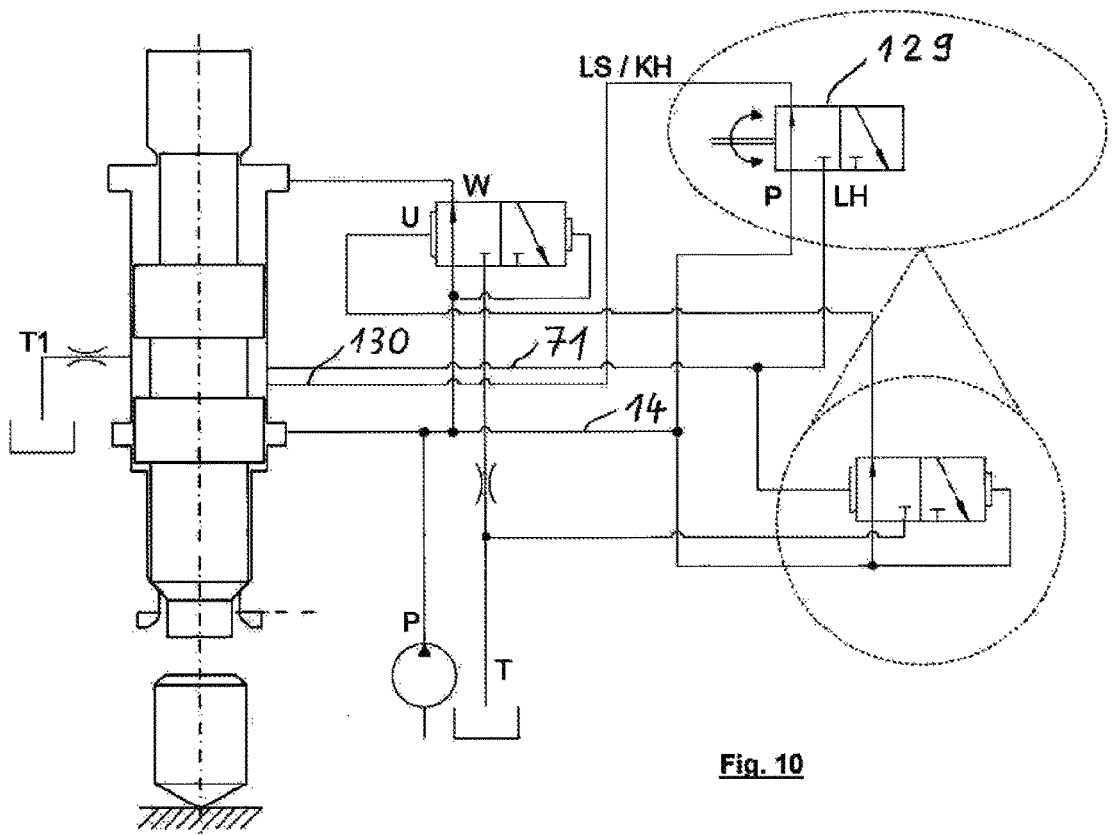

Description of FIG. 10:

Compared to the design according to FIG. 4, in this case in place of the two separate lines—no-load stroke line and short stroke line—one common signal line 130 is used that, in dependence on the switching position of a changeover valve 129 is either connected in the switching position no-load stroke safety (shut off) to the pressure line 14 in order to assume the function of a no-load stroke line, or in the other switching position, the short stroke position, is connected to the long stroke line 71 in order to assume the function of a short stroke line. Consequently, the function no-load stroke safety is activated only in the operating mode long stroke as the signal line 130 is connected to the pressure line 14. If the changeover valve 129 is switched into the switching position short stroke, the impact mechanism then also repeatedly carries out operating cycles and impact strokes, but at reduced stroke, the short stroke, as the signal line is not connected to a pressure line, but to the long stroke line. As the rotary slide valve comprises three connections 14, 71, 130 and is able to assume two switching positions, it belongs to the group of 3/2-way valves.

Description of FIG. 15:

The section through a simplified representation of a rotary slide valve 99 with an integrated pilot valve 68 that is realized as a longitudinal slide valve is shown. A rotary slide 2 is installed in a bore 16 in a housing 3, which is shown as a cut-out and can be part of the cylinder cover, of the cylinder, of a control block built onto the cylinder cover or cylinder or of other parts of the impact mechanism housing. The rotary slide 2 is secured in the housing against displacement in the axial direction by a cover 6 that closes the bore to the outside. The cover is fastened by screws 8 that engage in threaded bores of the housing 3. On the side pointing to the open end of the bore 16 the rotary slide 2 has a journal 4, on the end of which four wrench flats 5 are arranged symmetrically with respect to the valve axis 4 and form a square. A tool (not shown), for example, can be placed onto the wrench flats 5 in order to rotate the rotary slide 2 into another position. The wrench flats 5 are also utilized for the purpose of securing the rotary slide 2 against rotation once one of its switching positions has been reached, by having a locking plate 7, which comprises a recess in the center that comprises an inner contour that is similar to the journal 4 provided with the wrench flats 5 such that the plate with the recess is able to be pushed over the journal 4 with the wrench flats 5 and the inside faces of the recess surround the wrench flats 5 at a small spacing. If the rotary slide 2 were to be rotated slightly, the wrench flats 5 of the journal 4 would impact by way of the edges against the inside faces of the recess. Said positive locking prevents further rotation of the journal 4 and consequently of the rotary slide 2. The locking plate 7 comprises additionally two bores, through which screws 8 are able to be inserted in order to fasten the plate non-rotatably on the cover, the screws engaging by way of their external threaded faces in internal threaded faces of bores of the cover. The locking plate 7, with the screws removed, can also be used as a tool in order to rotate the rotary slide 2 by a rotary movement of the plate being transmitted via the wrench flats 5 to the journal and consequently to the rotary slide. The cover can comprise 4 threaded bores that are in each case offset 90° on a reference diameter, as a result of which the plate can be fastened on the cover after the switching, i.e. rotating the rotary slide by 90° and consequently switching over into the other switching position, without removing it from the journal 4. A seal (not shown) is inserted in a sealing groove 45 in order to seal the interior of the bore toward the outside. The rotary slide 2 and the cover can be provided with further sealing groves and seals (not shown) in order to avoid leakages along the outside surface of the rotary slide 2.

In place of a cover 6 fastened with screws to the housing, other designs (not shown) are also possible in order to secure the rotary slide 2 axially in the bore and to close the bore, for example by a threaded sleeve that, like the cover 6, comprises a central bore through which the journal of the rotary slide 2 is guided to the outside and that comprises an external threaded face and is fastened in the housing into a region, provided with an internal thread, of the bore that is stepped in diameter. On the end face that points to the outside the sleeve can comprise axial bores that are arranged symmetrically with respect to the valve axis and are located opposite one another and into which journals of a tool (pin-type face wrench) are able to engage in order to rotate the sleeve. However, wrench flats 5 can also be arranged on the outside surface of the sleeve in the form of a square, extending over a defined axial length of the sleeve. A sleeve-shaped tool (socket) with correspondingly realized inside faces can be slipped over the wrench flats for rotating the sleeve and the sleeve can be rotated in this manner.

For recognizing the switching position set, a marking in the form of a small bore 46 is arranged on the end face of the journal, the bore being arranged offset radially with respect to the axis of rotation of the valve. Similar markings 47 can be provided in the housing or cover in order to obtain a reference or stop point. In place of small bores, it is also possible to arrange grooves in the rotary slide 2 and cover or housing.

The rotary slide 2 has radial bores 35, 37, 39, 42, 43, 44 and grooves 30, 32 on its outer surface that, in dependence on the position of the rotary slide 2, can be moved to connect to bores 71, 76, 81, 84 of the housing or can be separated from them or sometimes can also be permanently connected to bores 14, 15, 67 of the housing.

The rotary slide 2 shown has two switching functions, the associated switching edges of which are arranged in different planes that are arranged perpendicular to the rotary slide axis and are spaced apart from one another. A first switching function is responsible for the stroke switch-over of the impact mechanism, a second for the no-load stroke safety mechanism. For each switching function in each case two bores, a long stroke bore 71 and a short stroke bore 76, or pressure bore 14 and no-load stroke bore 81, are arranged in the housing located opposite one another radially to the bore. For the switching function stroke switch-over, the rotary slide 2 comprises radial bores 35, 43 that are arranged such that in a switching position of the rotary slide 2, the long stroke position, the short stroke line 76 is covered and blocked by the outside surface of the rotary slide 2. Opposite, the radial bore 43 connects the long stroke line 71 to the axial bore 34 that leads to the control face 70 of the pilot valve 68. Consequently, only pressure signals from the long stroke line 71 are directed onto the control face of the pilot valve 68, not however from the short stroke line 76.

For the switching function no-load stroke safety, the rotary slide 2 comprises in another plane radial bores 39, 44 that are arranged such that in a switching position of the rotary slide 2, the long stroke position, the no-load stroke line 81 is connected via the radial bore 39 of the rotary slide 2 to the pressure line 14 in which the operating pressure is exerted. Consequently, operating pressure is exerted in the no-load stroke bore 81 during the operation of the impact mechanism in operating mode long stroke and brings about the activation of the function no-load stroke safety. As a result of the operating pressure exerted in the no-load stroke line, the design prevents further operating cycles of the impact mechanism when the impact piston overshoots the theoretical impact position in the impact stroke direction by a predetermined amount and the circumferential groove of the impact piston connects the no-load stroke bore to the long stroke bore. Consequently, the no-load stroke safety mechanism is activated in the operating mode long stroke.

Description of FIGS. 10*a*, 10*b*, 11*a*, and 11*b*:

The diagrams 10*a* and 10*b* or 11*a* and 11*b* show in each case a cross section of the valve in a plane transversely with respect to the valve axis and parallel to the housing bores 71 and 76 or 81 and 14.

Figure 10A:
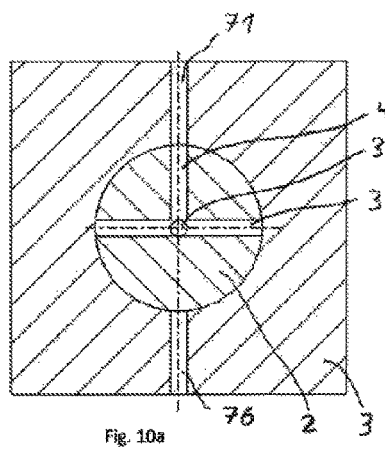
Figure 11A:
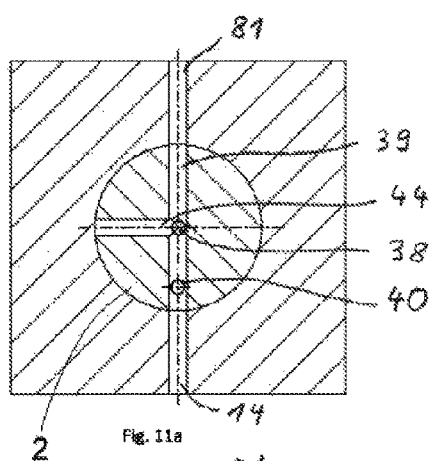
Figure 10B:
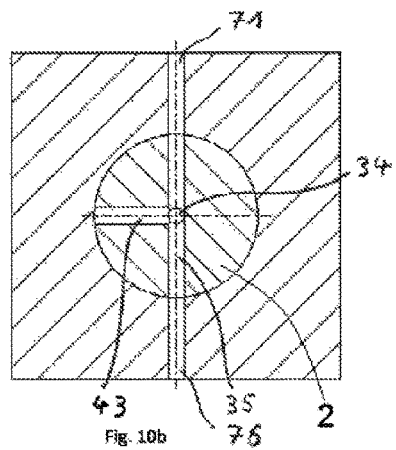
Figure 11B:
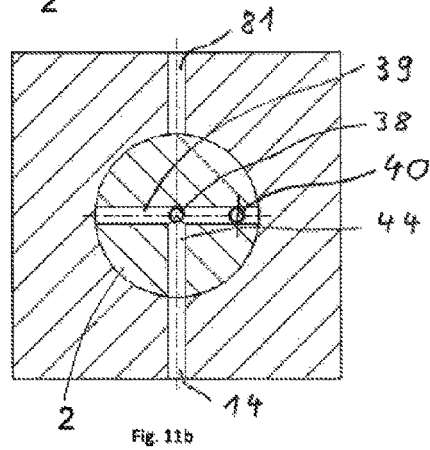

FIGS. 10*a* and 11*a* show the valve in the above-described switching position, the long stroke position.

If the rotary slide is rotated anticlockwise by 90° out of the switching position shown in diagrams 10*a*, 11*a*, the rotary slide reaches its second switching position, the short stroke position, the diagrams 10*b*, 11*b* showing in each case a cross section of the valve in two different planes.

For the switching function stroke switch-over (diagram 10*b*), the radial bore 35, which penetrates the entire rotary slide 2, connects the axial bore 34 both to the long stroke line 71 and to the short stroke line 76. Consequently, pressure signals from the short stroke line that are generated during the return stroke movement of the impact piston after a shorter impact piston path and pressure signals from the long stroke line are directed onto the drive face of the pilot valve, which results in the impact mechanism carrying out impact strokes with a short stroke.

For the switching function no-load stroke safety, in the second switching position (diagram 11*b*) the connection between the pressure line 14 and the no-load stroke line 81 is interrupted as the radial bore 44 does not penetrate the rotary slide 2 completely and the outside surface of the rotary slide covers the no-load stroke line.

Consequently, the no-load stroke line is not connected to a pressure line via the rotary slide valve, the no-load stroke safety mechanism is deactivated, as a result of which the impact mechanism carries out operating cycles even if the impact piston overshoots the theoretical impact position in the impact stroke direction. The no-load stroke safety mechanism is deactivated as a result in the operating mode short stroke.

Description of FIG. 15:

A pilot valve 68, which is realized as a longitudinal slide valve, is installed in the rotary slide 2. The rotary slide 2, for this purpose, comprises a bore 17 for the longitudinal slide i.e. the rotary slide provides the housing of the pilot valve 68. The pilot valve 68, in dependence on the switching position, connects the alternating pressure line 67, which is connected to the larger-area control face of the control slide, either to the pressure line 14 or the tank line 15. The pressure line 14 is connected via the pressure line 56 to the pump of the digger, the tank line 15 via the tank line 57 to the tank of the digger. In the simplified diagram, the bore 17 is shown closed at both ends. For producing and assembling the longitudinal slide, the rotary slide 2 comprises a closable assembly opening, e.g. in the form of a locking screw that is not shown for the purposes of better clarity. The axial bores 40 and 85 (FIG. 16) of the rotary slide 2 are likewise not guided as far as up to the end sides for the purposes of better clarity.

The longitudinal slide 68 comprises a resetting face 69, a ring-shaped relief face 84 and a control face 70. The largest-area face 70 is connected via the axial bore 34 to the radial bores 43 and 35 in order to produce a connection to the long stroke line 71 and, in dependence on the switching position of the rotary slide 2, additionally to the short stroke line 76. Said control face 70 has arranged opposite a smaller-area resetting face 69 that is connected constantly via the axial bore 38 and, in dependence on the switching position of the rotary slide 2, via one of the radial bores 39 or 44 to the pressure line 14. Also arranged opposite the control face 70 is the smaller-area relief face 84 that is connected constantly to the tank line 15 via a radial bore 37 and a circumferential groove 32 that is arranged on the rotary slide 2.

In addition, the longitudinal slide comprises on its outer outside surface a circumferential groove 23 that is always connected to the bore 42 that is arranged radially in the rotary slide 2 and via the circumferential groove 30 of the rotary slide is constantly connected to the reversing line 67.

The circumferential groove 23, in the switching position shown of the longitudinal slide, the impact stroke position, is connected to the pressure bore 41 that is arranged radially in the rotary slide 2 and is connected via an axial bore 40 and the radial bores 39 to the pressure line 14 that is arranged in the housing.

Figure 16:
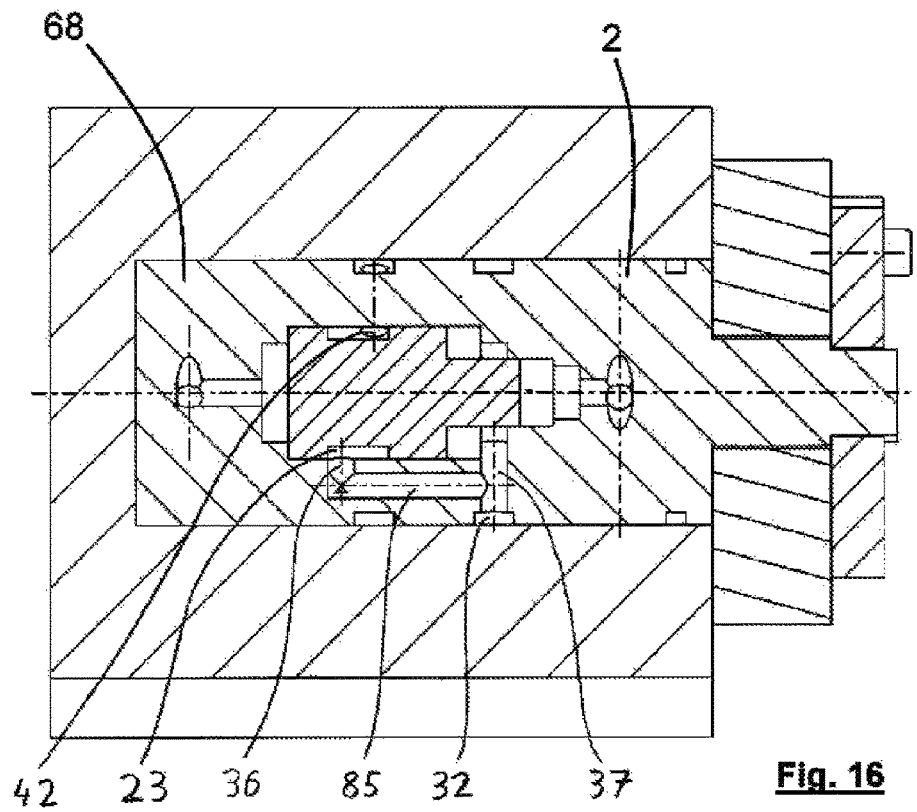

Description of FIG. 16:

Contrary to the section through the valve shown in FIG. 15, the section shown in FIG. 16 extends in a plane that also runs through the valve axis, but compared to the section 15 is arranged in an angularly offset manner such that the section extends through the axial tank bore 85 of the rotary slide 2. In addition, the pilot valve 68 is shown in the other switching position, the return stroke position. The circumferential groove 23 is no longer connected to the pressure bore 41 in the return stroke position, but is connected to the tank bore 36 that is arranged radially in the rotary slide 2 and is connected to the tank line 15 via an axial tank bore 85, the radial bore 37 and the circumferential groove 32. In the case of a corresponding arrangement of the bores and grooves, the radial bores of identical pressure levels, such as, for example, bores 36 and 37, can also be connected to one another via an axial groove on the outer outside surface of the rotary slide in place of via an axial bore.

If during the return stroke of the impact piston, the long stroke bore 71 is acted upon with operating pressure, the high operating pressure also acts on the control face 70, as a result of which the longitudinal slide assumes the switching position shown in FIG. 15, namely the impact stroke position, as the pressure acting constantly on the resetting face 69 generates a force that is smaller than the force of the larger control face 70 arranged opposite it. The reversing line 67 is connected via the circumferential groove 23 to the pressure line 14, as a result of which the control slide is also switched into the switching position—impact stroke position—as its large control face 66 is acted upon with the high operating pressure via the reversing line.

If at the end of the impact stroke of the impact piston, the long stroke bore 71 is relieved to the tank line, the pressure on the control face 70 is also relieved and the longitudinal slide assumes the switching position shown in FIG. 16, namely the return stroke position, as the pressure constantly acting on the resetting face generates a force that displaces the longitudinal slide to the left. The reversing line 67 is connected to the tank line 15 via the circumferential groove 23, as a result of which the control slide is also switched into the switching position—return stroke position—as its large control face 66 is relieved via the reversing line.

The longitudinal slide can include small bores and grooves that are not shown and are arranged such that they produce a throttled connection between the control face 70 and the circumferential groove 23 or, in dependence on the switching position, to a bore 41, 36, 37 that comprises a constant pressure level, as a result of which the pressure level prevailing on the control face is kept extensively constant, even if small oil leaks from the control face 70 occur away from or toward it, which would otherwise bring about a slow pressure change in the case of a long stroke bore or short stroke bore blocked by the impact piston.

Description of FIGS. 12*a*, 12*b*, 13*a* and 13*b*:

FIGS. 12*a* and 12*b*, or 13*a* and 13*b* each show a cross section through a valve in a plane transversely with respect to the valve axis and parallel to the housing bores 71 and 76 or 81 and 14.

Figure 12A:
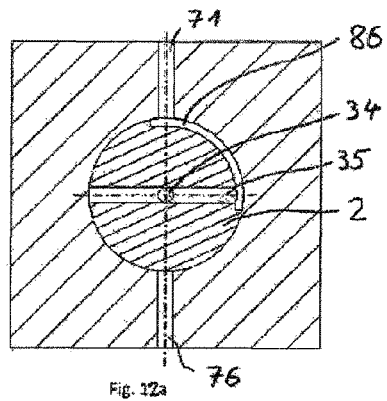
Figure 13A:
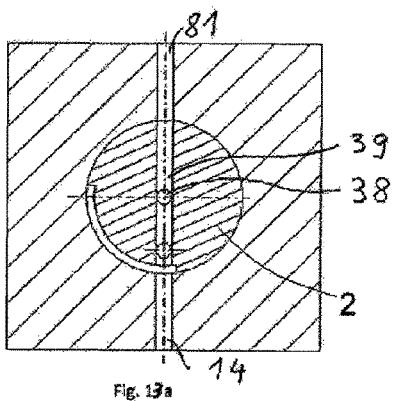
Figure 12B:
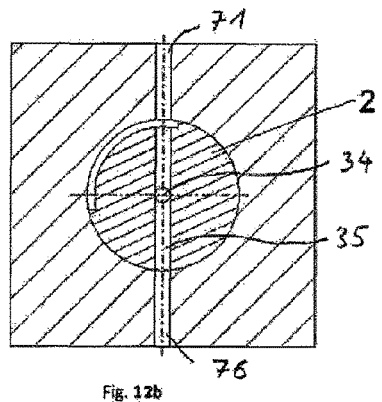
Figure 13B:
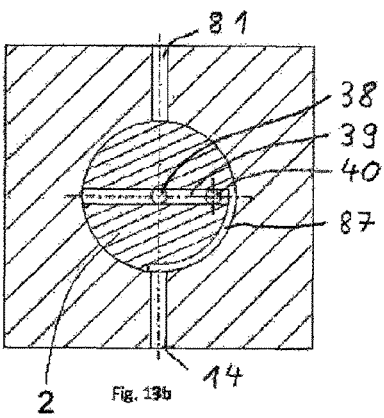

FIGS. 12*a* and 13*a* show the rotary slide valve in the above-described switching position, the long stroke position, diagrams 12*b* and 13*b* in the switching position, the short stroke position.

In order to connect the two opposite bores in the housing 71 and 76 or 81 and 14 together and to the axial bore 34 or 38 of the rotary slide 2 in one switching position of the rotary slide 2, in the other switching position, however, to connect only one of the two housing bores 71 or 14 to the axial bore 34 or 38 and to block the other housing bore 76 or 81, in place of the radial bores 43 or 44 (FIGS. 10*a*, 10*b*, 11*a*, 11*b*) that do not penetrate the rotary slide 2 completely, arcuate grooves 86 or 87 are arranged on the outer outside surface of the rotary slide 2 that extend at least over an angle that corresponds to the rotary angle that is necessary to switch over the rotary slide, which in said design is 90°.

In the switching position—long stroke position—of the rotary slide 2 (FIG. 12*a*), the short stroke line 76 is covered and blocked by the outer outside surface of the rotary slide 2. Opposite, the arcuate groove 86 connects the long stroke line 71 to the axial bore 34 that leads to the control face 70 of the pilot valve 68. Consequently, only pressure signals from the long stroke line 71 are directed onto the control face of the pilot valve, not however from the short stroke line 67.

In addition, in the switching position—long stroke position (FIG. 13*a*)—the no-load stroke line 81 is connected via the bore 39, which penetrates the rotary slide, to the pressure line 14 in which the operating pressure is exerted. Consequently, when the impact mechanism operates in long stroke mode there is operating pressure in the no-load stroke line, bringing about the activation of the function no-load stroke safety, as a result of which the design prohibits further operating cycles of the impact mechanism when the impact piston overshoots the theoretical impact position in the impact stroke direction by a predetermined amount. Consequently, the no-load stroke safety mechanism is activated in the operating mode long stroke.

When the rotary slide 2 is rotated anticlockwise by 90° out of the switching position shown in FIGS. 12*a*, 13*a*, the rotary slide 2 reaches its second switching position, the short stroke position that is shown in diagrams 12*b*, 13*b*.

For the switching function stroke switch-over (FIG. 12*b*), the radial bore 35, which penetrates the entire rotary slide 2, connects the axial bore 34 both to the long stroke line 71 and to the short stroke line 76. Consequently, pressure signals from the short stroke line and the long stroke line are directed onto the drive face of the pilot valve, which results in the impact mechanism carrying out impact strokes with a short stroke.

For the switching function no-load stroke safety, in the second switching position (FIG. 13*b*) the connection between the pressure line 14 and the no-load stroke line 81 is interrupted as the outer outside surface of the rotary slide 2 covers and blocks the no-load stroke line 81. The arcuate groove 87 connects the axial bores 38 and 40 to the pressure line 14 via the transverse bore 39 of the rotary slide 2 such that even in the switching position short stroke or no-load stroke safety, there is operating pressure on the resetting face 69 of the pilot valve and at the pressure inlet 41 of the pilot valve 68. Consequently, the no-load stroke line 81 is not connected to a pressure line via the rotary slide valve, the no-load stroke safety mechanism is deactivated, as a result of which the impact mechanism carries out operating cycles even when the impact piston overshoots the theoretical impact position in the impact stroke direction. The no-load stroke safety mechanism is deactivated as a result in the operating mode short stroke.

Description of FIGS. 14a, 14b, 14c and 14c:

FIG. 14a shows a section perpendicular to the rotary slide axis and parallel to the axes of the short stroke bore 76 and the long stroke bore 71.

FIG. 14b shows a section that is realized parallel to the section from FIG. 14a that is arranged, however, offset to the bores 76 and 71 and runs through the circumferential groove 88.

The rotary slide 2 comprises on its outer outside surface two force compensating faces in the form of two force compensating grooves 90 that are connected to a circumferential groove 88 and are connected hydraulically to the short stroke bore 76 in the housing 3 via a connecting groove 89 when the short stroke bore 76 is covered and blocked by the rotary slide 2 in the switching position long stroke position (FIG. 14a). As a result, in the switching position shown, there is the same pressure in the force compensating grooves as in the bore 76. The sum of the areas of the force compensating grooves is the same size or greater than the cross sectional area of the covered bore 76 such that the force components that act parallel to the axis of the bore 76 cancel each other out. If there is higher pressure in the bore 76 and lower pressure, however, in the bore 71 located opposite, without force compensating faces a radial, deflecting force that is produced from the cross sectional area of the blocked bore and the pressure difference between the two bores 71 and 76, would act on the rotary slide 2. The deflecting force leads to one-sided arrangement of the rotary slide 2 in the housing bore 16, which results in increased friction and wear of the components. When using force compensating faces, the axial force compensating grooves 90 generate forces that act radially on the rotary slide 2, the sum of which generates a force that opposes the deflecting force of the bore 76 and the amount of which corresponds approximately to the amount of the deflecting force.

In place of the force compensating grooves it is also possible to arrange, for example, a ring-shaped groove on the outside surface, concentrically around the outlet of the bore 43 that is connected hydraulically via corresponding bores or grooves to the blocked bore 76. The design of force compensating faces is not limited to the short stroke bore 76, but can be applied in the case of all bores or grooves where a radial force acts on a rotary slide 2 and leads to the radial deflection thereof.

Figure 17:
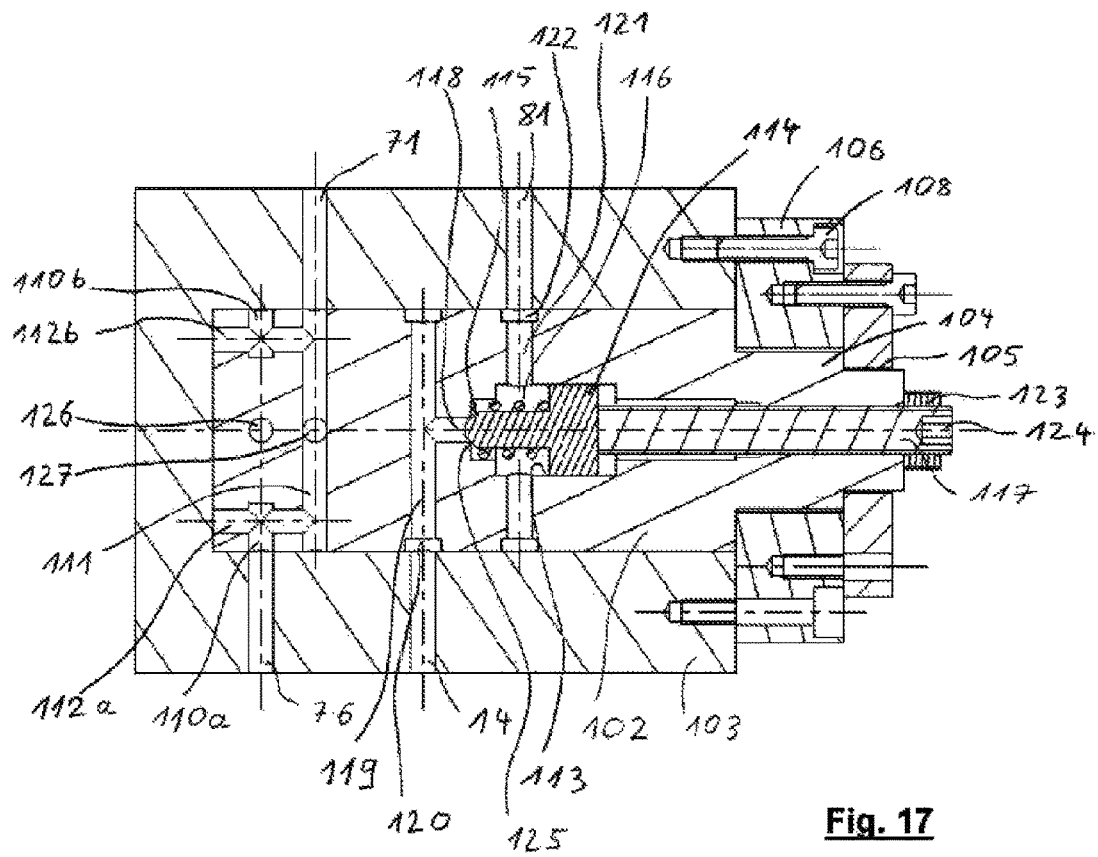

Description of FIG. 17:

FIG. 17 shows a combination of two valves that is also shown in the circuit diagram in FIG. 7.

A rotary slide 102 is installed in a bore in a housing 103, which is shown as a cut-out and can be part of the cylinder cover, of the cylinder, of a control block built onto the cylinder cover or cylinder or of other parts of the impact mechanism housing. The rotary slide 102 is secured in the housing against displacement in the axial direction by a cover 106 that closes the bore to the outside. The cover is fastened by screws 108 that engage in threaded bores of the housing 103. The rotary slide 102 has on the side that points to the open end of the bore a journal 104, on the end of which four wrench flats 105 are arranged symmetrically with respect to the valve axis and form a square. A tool (not shown), for example, can be placed onto the wrench flats in order to rotate the rotary slide 102 into another position. The wrench flats 105 are also utilized for the purpose of securing the rotary slide 102 against rotating once one of its switching positions has been achieved, by having a locking plate 107 that has a recess in the center that comprises an inner contour that is similar to the journal 104 that is provided with the wrench flats 105 such that the plate with the recess can be slipped over the journal 104 with the wrench flats 105 and the inside faces of the recess surround the wrench flats 105 at a small spacing. If the rotary slide 102 were to be rotated slightly, the wrench flats 105 of the journal 104 would impact by way of the edges against the inside faces of the recess. Said positive locking prevents further rotation of the journal 104 and consequently of the rotary slide 102. The locking plate comprises additionally two bores, through which screws 108 are able to be inserted in order to fasten the plate non-rotatably on the cover, the screws engaging by way of their external threaded faces in internal threaded faces of bores of the cover. The locking plate, with the screws removed, can also be used as a tool in order to rotate the rotary slide 102 by a rotary movement of the plate being transmitted via the wrench flats to the journal 104 and consequently to the rotary slide 102. The cover can comprise 4 threaded bores in each case offset 90° on a reference diameter, as a result of which the plate can be fastened on the cover after the switching, i.e. rotating the rotary slide 102 by 90° and consequently switching over into the other switching position, without removing it from the journal 104. The rotary slide 102 and the cover can be provided with sealing grooves and seals (not shown) in order to avoid leakages along the outer outside surface of the rotary slide 102.

The rotary slide 102 comprises the switching function of a manually actuated stroke switch-over valve. Depending on the switching position of the rotary slide 102, a connection between the short stroke bore 76 arranged in the housing 103 and the long stroke bore 71 is produced or blocked. The long stroke and short stroke bores are parallel to one another, but are arranged offset to one another in the direction of the longitudinal axis of the rotary slide. In the switching position shown, the short stroke position, the short stroke bore 76 is connected to the long stroke bore via a transverse bore 110a that does not penetrate the rotary slide 102 completely, an axial bore 112a and a further transverse bore 111 that is arranged parallel to the transverse bore 110a and penetrates the rotary slide 102 completely and is positioned concentrically with respect to the long stroke line 71. Consequently, pressure signals from the short stroke line, which are generated during the return stroke movement of the impact piston after a impact piston path that is shorter compared to the long stroke and pressure signals from the long stroke line are directed onto the control face of the pilot valve, which results in the impact mechanism carrying out impact strokes with a short stroke (short stroke).

As the bore 111 penetrates the rotary slide 102 completely, the forces acting radially on the rotary slide 102 on account of the bore 111 being acted upon with pressure are compensated for. As a result of the bore 110a having a second bore 110b that is arranged opposite and is hydraulically connected to it, the forces acting radially on the rotary slide 102 on account of the bores 110a and 110b being acted upon with pressure are also compensated for.

Figure 18:
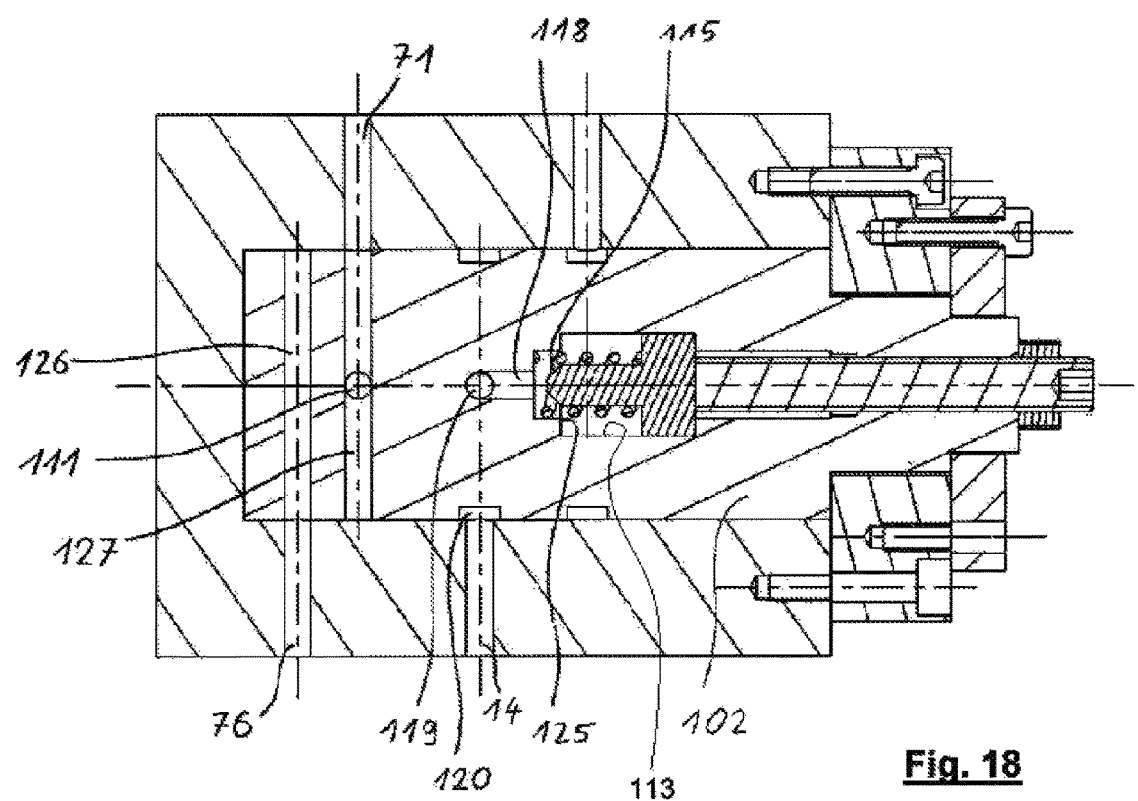

Description of FIG. 18:

If the rotary slide 102 is rotated by 90° into its second switching position, the long stroke position, the pressure compensating bore 126 of the rotary slide 102 is moved into coincidence with the short stroke bore 76 and the pressure compensating bore 127 of the rotary slide 102 is moved into coincidence with the long stroke bore 71 such that the pressure from the short stroke bore is exerted in the pressure compensating bore 126 and the pressure from the long stroke bore is exerted in the pressure compensating bore 127. As the pressure compensating bores 126, 127 penetrate the rotary slide 102 completely, the radial forces that act on the rotary slide 102 and are generated by the pressure acting in the short stroke line or long stroke line, are balanced out. As the radial pressure compensating bores 126, 127 are not connected via an axial bore, the connection between the long stroke bore and the short stroke bore is interrupted. Consequently, only pressure signals from the long stroke line 71 are directed onto the control face of the control slide or of the pilot valve, not however from the short stroke line 76. The impact mechanism only carries out impact strokes with a normal stroke (long stroke).

Description of FIG. 17:

For the switching function no-load stroke safety, a longitudinal slide 114, which comprises a sealing cone 115 and is pressed by a spring 116 against an axially displaceable threaded bolt 117, is arranged in a bore 113 of the rotary slide 102 provided with shoulders. The bore is at the end facing the sealing cone via an axial bore 118 that is constantly connected to the pressure line 14 via a transverse bore 119 and a circumferential groove 120 on the outer surface of the rotary slide 102. The end of the axial bore 118 that opens out into the bore provides the valve seat 125 for the sealing cone 115 of the longitudinal slide 114. The longitudinal slide and the valve seat provide a seat valve. The bore is connected constantly to the no-load stroke line 81 via radial bores 121 and a circumferential groove 122 on the outer surface of the rotary slide 102. The threaded bolt is guided via its external thread in a corresponding internal threaded bore of the rotary slide 102. The threaded bolt can be secured against unintended rotation via a hexagonal nut 123 that is provided with an internal thread and is screwed onto the outwardly pointing end of the threaded bolt. To this end, the threaded bolt is prevented from rotating via a tool and is fixed via the nut, i.e. rotated such that it comes to abut against the outside of the cover. The threaded bolt is clamped as a result and secured in a positive locking manner again rotation. For rotating or fixing the threaded bolt, a tool can be inserted into the hexagonal socket indentation 124 of the threaded bolt.

In the switching position shown, the normal operating position, of the longitudinal slide 114, the threaded bolt is screwed into the rotary slide 102 so far that it presses the longitudinal slide 114 against the force of the spring, with the sealing cone 115 against the valve seat 125 and interrupts the connection between the axial bore 118 that is acted upon with operating pressure and the radial bores 121 that are connected to the no-load stroke line. Consequently, the no-load stroke line 81 is not connected to a pressure line via the longitudinal slide valve, the no-load stroke safety mechanism is deactivated, as a result of which the impact mechanism carries out operating cycles even when the impact piston overshoots the theoretical impact position in the impact stroke direction.

Description of FIG. 18:

In order to activate the no-load stroke safety mechanism, after releasing the hexagonal nut 123 acting as counter nut, the threaded bolt is rotated so far that it is displaced on account of the thread by a few millimeters out of the rotary slide 102. On account of the force of the spring 116, the longitudinal slide 114 is pressed against the threaded bolt and follows the movement thereof, as a result of which the sealing cone 115 is raised from the valve seat 125 and releases a connection between the axial pressure bore 118 and the bore 113. As shown in FIG. 17, the bore 113 is connected to the no-load stroke line via the radial bores 121 and the circumferential groove 122. The operating pressure exerted in the pressure bore 14 is directed via the circumferential groove 120, the radial bores 119, the axial pressure bore 118, the bore 113, the radial bores 121 and the circumferential groove 122 into the no-load stroke line 81. Consequently, operating pressure is exerted in the no-load stroke line 81 during the operation of the impact mechanism, bringing about the activation of the function no-load stroke safety. As a result of the operating pressure exerted in the no-load stroke line, the design prohibits further operating cycles of the impact mechanism when the impact piston overshoots the theoretical impact position in the impact stroke direction by a predetermined amount and the circumferential groove of the impact piston connects the no-load stroke bore to the long stroke bore. The switching function no-load stroke safety can be switched independently of the switching function stroke switch-over.

The threaded bolt can be designed such that the threaded bolt is prevented from being completely pulled out of the receiving thread of the rotary slide 102. For example, the bolt can comprise a shoulder (not shown) such that the end of the bolt pointing to the longitudinal slide 114 comprises a larger diameter than the internal threaded bore. If the threaded bolt, when being rotated out, exceeds a predetermined amount in the axial direction, the shoulder of the threaded bolt strikes against the shoulder of the internal threaded bore, which prevents further rotation of the threaded bolt. In place of a shoulder, the bolt can also comprise a constant outside diameter and a circumferential groove into which is inserted a locking ring with a round cross section that projects beyond the outside diameter of the bolt and consequently provides a stop.

In place of an axially displaceable longitudinal slide valve 114, a second rotary slide, which can be realized in a similar manner to the rotary slides 2, 102, can also be incorporated in the rotary slide 102, the rotary slide 2, 102 forming the housing for the second rotary slide. Such a design is not shown here.

The rotary slide 2, 102 can also be guided in valve sleeves that, in turn, are inserted into the housing. As a result, the guide face of the bore can consist of a different material and can have different material characteristics to the material of the housing into which the sleeve is inserted. Likewise, a valve sleeve, in which the valve element of the secondary valve is guided, can be inserted into the rotary slide.

The actuation of the valves can be effected manually by the operator switching the valve by hand, where applicable by a tool, or hydraulically, for example as a result of pressurizing a switching face with pressurized oil, by means of an electrically or hydraulically actuated motor or an electric switching magnet.

The invention claimed is:

1. In combination with a hydraulic impact mechanism having an impact piston movable through a stroke, a valve assembly comprising:
    a main rotary slide valve with a rotary slide and having a first switching function that modifies the stroke of the impact piston and a second switching function that determines whether the impact mechanism executes further impact strokes after the occurrence of at least one no-load stroke;
    a secondary valve having a pilot-valve element held in the rotary slide;
    a control slide valve having a pair of opposite faces; and respective hydraulic lines between the secondary valve in the rotary slide of the main rotary slide valve and the faces of the control slide valve for reversing the control slide valve by the secondary pilot valve.

2. The valve assembly as claimed in claim 1, wherein the secondary valve is a rotary slide valve, a longitudinal slide valve or a seat valve.

3. The valve assembly as claimed in claim 1, wherein the main valve is actuatable manually and the secondary valve is actuatable manually or hydraulically.

4. The valve assembly as claimed in claim 1, wherein the first and second switching functions have respective first and second switching positions, and the switching positions are coupled such that when the impact mechanism carries out impact strokes with a long stroke as a result of the first switching position of the first switching function, the impact mechanism is stopped once a no-load stroke occurs as a result of the first switching position of the second switching function and in that when the impact mechanism carries out impact strokes with a short stroke as a result of the second switching position of the first switching function, the impact mechanism is not stopped once a no-load stroke occurs as a result of the second switching position of the second switching function and carries out no-load strokes repeatedly.

5. The valve assembly as claimed in claim 1, wherein the first and second switching functions have respective first and second switching positions that are coupled such that in the first switching position a no-load stroke line is connected to a pressure line that provides the operating pressure and a short stroke line is separated from a long stroke line and in the second switching position the no-load stroke line is separated from the pressure line that provides the operating pressure and the short stroke line is connected to a long stroke line.

6. The valve assembly as claimed in claim 1, wherein the main valve is a 4/2-way rotary slide valve and the secondary valve is a 3/2-way longitudinal slide valve.

7. The valve assembly as claimed in claim 1, wherein the main valve is a 4/3-way rotary slide valve and the secondary valve is a 3/2-way longitudinal slide valve.

8. The valve assembly as claimed in claim 1, wherein the main valve is a 3/2-way rotary slide valve and the secondary valve is a 3/2-way longitudinal slide valve.

9. The use of a valve assembly as claimed in claim 1, wherein the main valve is arranged on a impact mechanism of a hydraulic hammer.

* * * * *